US008041183B2

(12) United States Patent
Tanaka et al.

(10) Patent No.: US 8,041,183 B2
(45) Date of Patent: Oct. 18, 2011

(54) DEVICE FOR RECORDING AND PLAYING STREAM DATA

(75) Inventors: Ryuichiro Tanaka, Kyoto (JP); Noriaki Kubo, Osaka (JP)

(73) Assignee: Panasonic Corporation, Osaka (JP)

( * ) Notice: Subject to any disclaimer, the term of this patent is extended or adjusted under 35 U.S.C. 154(b) by 1534 days.

(21) Appl. No.: 10/329,345

(22) Filed: Dec. 27, 2002

(65) Prior Publication Data

US 2003/0123854 A1    Jul. 3, 2003

(30) Foreign Application Priority Data

Dec. 27, 2001    (JP) ................................ 2001-396998

(51) Int. Cl.
*H04N 9/80* (2006.01)
(52) U.S. Cl. ........................................ 386/239; 386/286
(58) Field of Classification Search .................... 386/46,
386/81, 95, 109–112, 117, 118, 124, 235–237,
386/239, 248, 286, 291, 326, 328–334, 98;
369/50, 54, 116; 382/100, 236; 348/143,
348/153, 207.94, 231.98; 360/5, 15
See application file for complete search history.

(56) References Cited

U.S. PATENT DOCUMENTS

| | | | | |
|---|---|---|---|---|
| 5,841,597 A | * | 11/1998 | Mashimo | 360/15 |
| 5,974,018 A | * | 10/1999 | Takenaka | 369/84 |
| 6,247,069 B1 | | 6/2001 | Smyers | |
| 6,272,088 B1 | | 8/2001 | Aramaki et al. | |
| 6,449,514 B1 | * | 9/2002 | Natsubori et al. | 700/19 |
| 6,781,581 B1 | * | 8/2004 | Lee | 345/213 |
| 6,975,808 B1 | * | 12/2005 | Uchihara et al. | 386/117 |
| 7,236,687 B2 | * | 6/2007 | Kato et al. | 386/95 |
| 2002/0003948 A1 | * | 1/2002 | Himeno et al. | 386/98 |
| 2002/0061181 A1 | * | 5/2002 | Honjo | 386/52 |
| 2002/0186961 A1 | * | 12/2002 | Kikuchi et al. | 386/98 |

FOREIGN PATENT DOCUMENTS

| | | |
|---|---|---|
| CN | 1304138 | 7/2001 |
| EP | 0 512 821 A2 | 11/1992 |
| EP | 1 098 523 | 5/2001 |
| JP | 8-339630 | 12/1996 |
| JP | 9-139914 | 5/1997 |

(Continued)

OTHER PUBLICATIONS

Japanese Office Action, with English translation, issued in Japanese Patent Application No. JP 2002-377215, mailed Jan. 22, 2008.

(Continued)

*Primary Examiner* — Thai Tran
*Assistant Examiner* — Mishawn Dunn
(74) *Attorney, Agent, or Firm* — McDermott Will & Emery LLP

(57) ABSTRACT

Time stamps are attached to packets output from stream data input section by a time stamp-attaching section in a HDD, and the packets are then recorded into a HDD main unit. A stream data-generating section removes the time stamps from the packets subsequent to a predetermined amount of packets last recorded into the HDD main unit and controls the timing of the packets according to the time stamps, and the packets are transferred to an HDD. In the HDD, time stamps start to be generated according to the last predetermined amount of packets, and to the packets transferred thereafter, time stamps are attached in a similar fashion as in the HDD, so that the packets are recorded into the HDD main unit.

26 Claims, 19 Drawing Sheets

| FOREIGN PATENT DOCUMENTS | | |
|---|---|---|
| JP | 2000-90575 | 3/2000 |
| JP | 2000-156838 | 6/2000 |
| JP | 2000-349833 | 12/2000 |
| WO | WO 96/30905 | 10/1996 |

OTHER PUBLICATIONS

European Search Report issued in European Patent Application No. 02028995.5-1247, mailed Aug. 16, 2010.

* cited by examiner

HDD 104
start of recording

HDD 103
start of playing

HDD 104
start of playing

HDD 104
recording

HDD 103
recording

HDD 103
playback

HDD 104
playback

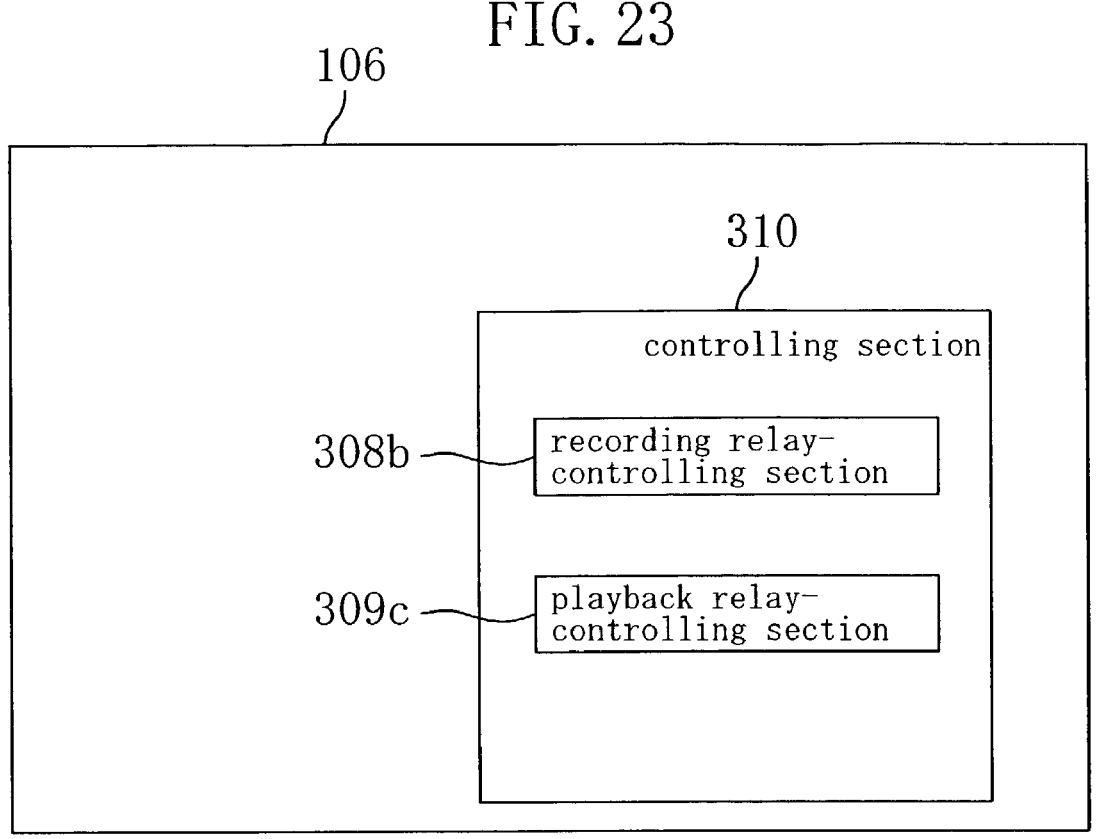

DEVICE FOR RECORDING AND PLAYING STREAM DATA

BACKGROUND OF THE INVENTION

The present invention relates to techniques pertaining to stream data recording and playing devices that can record and play stream data for, for example, broadcasted programs, and more particularly to stream data recording and playing devices, stream data recording and playing controlling devices, and stream data recording and playing methods that can record and play long time, continuous stream data.

MPEG-2 transport stream format (hereafter referred to as MPEG-2TS) has been used for stream data for, for example, programs broadcasted from broadcast stations. ("MPEG" is an abbreviation of Motion Picture Expert Group. MPEG-2 is a standard specified by ISO/IEC and is documented in ISO/IEC 13818.) Stream data in such a format as described above are sent out from a broadcast station at a predetermined transmission rate, and the system time clock of the receiving side decoder is synchronized with that of the sending side encoder in order to produce images and sound at proper timing.

If the received stream data are recorded in a recording and playing device (a recording medium), such as a hard disk, as they are and thereafter the data are played back, it is difficult to present the images or sound as they are received from a broadcast station. This is due to the fact that in general, the speed of data recording into or reading from a hard disk or the like is not specifically controlled (i.e., accurate speed is not guaranteed), and therefore, stream data with proper timing cannot be obtained if the data that have been read out are output without any processing.

In view of this problem, a time stamp recording system is known in which, when received data are recorded, time stamps are attached to the received data in the units of packets or the like based on the system time clock that is synchronized with the sender side encoder or the like. With this system, when playing back the recorded data, data read out from a recording medium are output at timing corresponding to time stamps, and as a result, images and sound can be presented just like the data received from a broadcast station.

However, with the above-described conventional stream data recording and playing device, although stream data can be recorded with the use of time stamp recording system as described above, it is necessary that time stamps attached to a series of stream data have continuity and therefore such a series of stream data must be recorded in a single recording and playing device. For this reason, the conventional device has a drawback in that it is difficult to record and/or play stream data having an amount of data larger than (longer than) the storage capacity of a single recording and playing device. It should be noted that when data to be recorded do not require synchronization of data transmission, they can be handled in a similar way to character data and still image data even though the data are image data or the like, so there will be no problem if the data are divided and stored into a plurality of recording media, as disclosed in Japanese Unexamined Patent Publication No. 2000-349833. In contrast, when the data are stream data, it is difficult to divide and record them while their continuity is being maintained.

SUMMARY OF THE INVENTION

In view of the foregoing and other problems, it is an object of the present invention to record stream data for a longer time than the time corresponding to the storage capacity of a single stream data recording and playing device so that the data can be played back at proper timing, and to play the data at proper timing.

In order to accomplish the foregoing and other objects, the present invention provides, in a first aspect, a stream data-recording device for recording stream data into a recording medium, the stream data containing time information corresponding to reproduction timing and being input at timing corresponding to stream of reproduction time, comprising: an analyzing means for analyzing the input stream data and extracting recording data to be recorded in the recording medium; a time stamp-attaching means for generating a time stamp that is synchronized with the time information contained in the recording data and attaching the time stamp to the recording data; a recording means for recording the recording data in the recording medium; and an output means for generating transfer stream data by removing the time stamp from the recording data that include last data of a predetermined amount of recording data to be recorded into the recording medium and data subsequent thereto, and outputting the generated transfer stream data to another stream data recording device at timing corresponding to the time stamp.

Accordingly, at the time when recording data to be recorded in the recording medium are once extracted, the accurate amount of the recording data can be detected, and the recording data to be recorded into the stream data recording device are distinguished from the recording data to be transferred and recorded into other stream data recording devices. Therefore, recording that leads to proper playback is possible and data overlap and data loss of the stream data are not caused over a plurality of stream data recording device, and consequently, no wasted recording space is created in the recording medium. Moreover, the data transfer to another stream data recording device is performed with stream data according to timing control using time stamps that are temporarily attached, and last data of a predetermined amount of recording data to be recorded in the stream data recording device are transferred in advance of the recording data to be recorded in the other stream data recording device. Consequently, for the other stream data recording device, it is easy to generate a time stamp that is continuous with a time stamp of the recording data to be recorded in the stream data recording device, and to attach the time stamp to the recording data when the data are recorded. Thus, recording that enables stream data to be played while maintaining their continuity can be easily performed. As a consequence, stream data can be recorded for a longer time than a time corresponding to the storage capacity of a single stream data recording device, and as continuous time stamps are attached to the stream data, the stream data can be played at proper timing with continuity.

In the foregoing device, it is possible that when the output means outputs the transferred stream data to further another stream data recording device subsequent to the other stream data recording device, the output means further outputs the transfer stream data generated based on the recording data that are to be recorded into the other stream data recording device and are subsequent to last data of a predetermined amount of recording data to the further another stream data recording device.

With this configuration, in the further another stream data recording device as well, the last data of a predetermined amount of recording data to be recorded in the other stream data recording device are transferred to the further another stream data recording device. Thus, in the further another stream data recording device, a time stamp can be easily generated that is continuous with the time stamp for the recording data to be recorded in the other stream data recording device, and the generated time stamps can be attached and recorded with the recording data. Therefore, recording that enables stream data to be played while maintaining their continuity can be easily performed with a further larger number of stream data recording devices.

The present invention also provides, in another aspect, stream data-recording device for recording stream data into a recording medium, the stream data containing time information corresponding to reproduction timing and being input at timing corresponding to stream of reproduction time, comprising: an analyzing means for analyzing the stream data and extracting last data of a predetermined amount of recording data that are recorded in the recording medium in the other stream data recording device and recording data that are subsequent to the predetermined amount of recording data; a time stamp-attaching means for generating a time stamp that is synchronized with the time information contained in the recording data and attaching the time stamp to at least the recording data that are subsequent to the predetermined amount of recording data; and a recording means for recording the recording data that are subsequent to the predetermined amount of recording data.

With this configuration, the time stamp is generated based on the recording data that include the last data and data subsequent thereto of a predetermined amount of recording data to be recorded in a preceding stream data recording device such as described above, and therefore, a time stamp continuous with the time stamp of the recording data to be recorded in the preceding stream data recording device can be generated and attached to the recorded data. Thus, recording that enables stream data to be played while maintaining their continuity can be easily performed as described above.

It is possible that in the foregoing stream data recording device, an output means for generating transfer stream data by removing the time stamp from the recording data that include last data of a predetermined amount of recording data to be recorded into the recording medium and data subsequent thereto, and outputting the generated transfer stream data to further another stream data recording device at timing corresponding to the time stamp.

Thus, stream data transferred from one of the foregoing stream data recording devices are transferred to further another stream data recording device, and consequently, recording that enables stream data to be played while maintaining their continuity can be easily performed with a further larger number of stream data recording devices.

The present invention provides, in still another aspect, a stream data-recording device for recording stream data into a recording medium, the stream data containing time information corresponding to reproduction timing and being input at timing corresponding to stream of reproduction time, comprising: an analyzing means for analyzing the input stream data and extracting recording data to be recorded in the recording medium and a recording medium of another stream data recording device; a time stamp-attaching means for generating a time stamp that is synchronized with the time information contained in the recording data and attaching the time stamp to the recording data; an output means for generating transfer stream data by removing the time stamp from the recording data to be recorded in the recording medium of the other stream data recording device and outputting the generated transfer stream data to the other stream data recording device at timing corresponding to the time stamp; and a recording means for recording, in the recording medium, recording data that are subsequent to the recording data to be recorded in the recording medium of the other stream data recording device.

Thus, with the transfer similar to the foregoing, recording has been first performed in the other stream data recording device, and thereafter, recording is performed in the stream data recording device. Therefore, recording can be performed while continuous time stamps are attached to the recording data, and recording that enables stream data to be played while maintaining their continuity can be easily performed.

The present invention provides, in yet another aspect, a stream data playing device for playing back continuous stream data from first and second recording data to which continuous time stamps are attached and which are respectively recorded in a first recording medium in the stream data playing device and in a second recording medium in another stream data playing device, comprising: a playing means for reading out the first recording data from the first recording medium and outputting the first recording data as first playback output data; an analyzing means for analyzing transfer stream data that are generated by the other stream data playing device by reading out the second recording data from the second recording medium and removing the time stamp therefrom, and are output from the other stream data playing device at timing corresponding to the time stamp, and for extracting second playback output data; a time stamp-attaching means for generating a time stamp synchronized with time information contained in the second playback output data and attaching the time stamp to the second playback output data; and an outputting means for generating playback stream data by removing the time stamps from the first playback output data and the second playback output data and sequentially outputting the generated playback stream data at timing corresponding to the time stamps.

With this configuration, the playback output data are extracted from the stream data transferred with timing control from the other stream data playing device based on the time stamps and the time stamps are attached. Thus, the same time stamp can be attached as that attached to the recording data recorded in the other stream data playing device, that is, the time stamp continuous with the recording data recorded in the stream data playing device can be attached. Therefore, stream data playback can be performed while continuity is maintained as in a similar manner to the case where all the recording data are recorded in the single stream data playing device.

It is preferable that in the foregoing stream data playing device, the outputting means outputs playback stream data generated from the first playback output data after playback stream data generated from the second playback output data have been output.

With this configuration, since it is relatively easy to read out the first recording data recorded in the stream data recording device at proper timing, it is possible to quickly output the playback stream data generated from the first playback output data easily after the playback stream data generated from the second playback output data are output, for example, while the capacity of the buffer is suppressed.

The present invention provides, in further another aspect, a stream data recording-controlling device for controlling recording of stream data into a recording medium of a stream data recording device, the stream data containing time information corresponding to reproduction timing and being input at timing corresponding to stream of reproduction time, comprising: an analyzing means for analyzing the input stream data and extracting recording data to be recorded in the recording medium; a time stamp-attaching means for generating a time stamp that is synchronized with the time information contained in the recording data and attaching the time stamp to the recording data; and an output means for generating transfer stream data by removing the time stamp from the recording data, for outputting the generated transfer stream data at timing corresponding to the time stamp to the stream data recording device, and for outputting, prior to start of the outputting transfer stream data, predetermined stream data containing time information that is precedent to the transfer stream data at the start of the outputting to the stream data recording device.

With this configuration, according to a similar mechanism to that described for the foregoing first aspect of the invention, time stamps continuous with one another are easily generated in a plurality of stream data recording devices so that they can be attached to the recording data and are recorded. As a consequence, recording that enables stream data to be played while maintaining their continuity can be easily performed over a plurality of stream data recording devices. Consequently, stream data can be recorded for a longer time than a time corresponding to the storage capacity of a single stream data recording device, and moreover, playback can be performed at proper timing with continuity since continuous time stamps are attached to the stream data.

It is preferable that in the foregoing stream data recording-controlling device, when the output means outputs the transfer stream data to a stream data recording device subsequent to the second stream data recording device onward, the output means outputs, as the predetermined stream data containing time information, the transfer stream data that are to be output to a preceding stream data recording device also to a subsequent stream data recording device.

Thus, the transfer stream data to be output to the preceding stream data recording device are used as the predetermined stream data containing time information that precedes the transfer stream data at the start of the outputting when data are output from the stream data recording-controlling device to the stream data recording device, as described above. Therefore, the time stamps generated in the stream data recording devices can be easily synchronized with one another.

The present invention provides, in yet another aspect, a stream data playback-controlling device for controlling output of continuous playback stream data based on recording data to which continuous time stamps are attached and which are respectively recorded into a plurality of stream data playing device, comprising: an analyzing means for analyzing transfer stream data that are generated by each of the stream data playing devices by removing the time stamps from the recording data respectively recorded therein and outputting at timing corresponding to the time stamps, and for extracting playback output data; a time stamp-attaching means for generating a time stamp synchronized with the time information contained in the playback output data and attaching the time stamp to each of the playback output data; and an outputting means for generating playback stream data by removing the time stamp from each of the playback output data and sequentially outputting the generated playback stream data at timing corresponding to the time stamp.

With this configuration, according to a similar mechanism to that described in the foregoing, the same time stamps can be attached as those recorded in the plurality of stream data playing devices, that is, time stamps continuous with one another can be attached. Therefore, stream data playback can be performed while continuity is maintained as in a similar manner to the case where all the recording data are recorded through the single stream data playback-controlling device.

The present invention provides, in still another aspect, a stream data-recording method of recording stream data into a recording medium, the stream data containing time information corresponding to reproduction timing and being input at timing corresponding to stream of reproduction time, wherein: continuous time stamps are attached to the stream data and the stream data are divided and recorded into a plurality of stream data recording devices so that the stream data do not overlap.

With this configuration, stream data are divided and recorded into a plurality of stream data recording devices, and consequently, the stream data can be recorded for a longer time than a time corresponding to the storage capacity of a single stream data recording device. In addition, since continuous time stamps are attached to the stream data, playback can be performed at proper timing while maintaining continuity. Moreover, no overlap occurs during recording, and therefore, wasteful recording space is not created.

The present invention provides, in another aspect, a stream data-recording method of recording stream data into a recording medium of a stream data recording device, the stream data containing time information corresponding to reproduction timing and being input at timing corresponding to stream of reproduction time, comprising: a first extracting step of analyzing the input stream data and extracting recording data to be recorded in the recording medium; a first time stamp-attaching step of generating a time stamp synchronized with the time information contained in the recording data and attaching the time stamp to the recording data; an outputting step of dividing the recording data to which the time stamp is attached, generating transfer stream data by removing the time stamp from the divided recording data, and transferring the generated transfer stream data to the stream data recording device at timing corresponding to the time stamp; a second extracting step of, in the stream data recording device to which the transferred stream data are input, analyzing the input stream data and extracting recording data to be recorded in the recording medium of the stream data recording device; a second time stamp-attaching step of generating a time stamp synchronized with the time information contained in the recording data and attaching the time stamp to the recording data; and a recording step of recording the recording data to which the time stamp is attached into the recording medium.

With this configuration, according to a similar mechanism to that described for the foregoing first aspect of the invention, time stamps continuous with one another are easily generated in a plurality of stream data recording devices so that they can be attached to the recording data and are recorded. As a consequence, recording that enables stream data to be played while maintaining their continuity can be easily performed over a plurality of stream data recording devices. Consequently, stream data can be recorded for a longer time than a time corresponding to the storage capacity of a single stream data recording device, and moreover, playback can be performed at proper timing with continuity since continuous time stamps are attached to the stream data.

The present invention provides, in yet another aspect, a stream data playing method of playing continuous stream data from recording data to which continuous time stamps are attached and which are recorded into recording media of a plurality of stream data recording devices, comprising: a playing step of reading out the first recording data recorded in a recording medium of the first stream data recording device and outputting the data as the first playback output data; an outputting step of, in the second stream data recording device, reading out the second recording data recorded in the recording medium, and outputting transfer stream data generated by removing the time stamps at timing corresponding the time stamps; an extracting step of analyzing the transfer stream data that are output and extracting second playback output data; a time stamp-attaching step of generating a time stamp being synchronized with the time information contained in the second playback output data and continuous with a time stamp attached to the first playback output data, and attaching the generated time stamp to the second playback output data; and an outputting step of generating playback stream data by removing the time stamps from the first and the second playback output data to which the time stamps are attached, and sequentially outputting the generated playback stream data at timing corresponding to the time stamps.

The present invention provides, in further another aspect, a stream data playing method of playing continuous stream data from recording data to which continuous time stamps are attached and which are recorded into recording media of a plurality of stream data recording devices, comprising: an outputting step of reading out the recording data respectively recorded into the recording media in the plurality of stream data recording devices and outputting transfer stream data generated by removing the time stamps at timing corresponding to the time stamps; an extracting step of analyzing the transfer stream data that are output and extracting playback output data; a time stamp-attaching step of generating time stamps that are synchronized with the time information contained in the playback output data and are continuous between the playback output data corresponding to the plurality of stream data recording devices, and attaching the generated time stamps to the playback output data; and an outputting step of generating playback stream data by removing the time stamps from the playback output data to which the time stamps are attached, and sequentially outputting the generated playback stream data at timing corresponding to the time stamps.

With this configuration, according to a similar mechanism to that described in the foregoing, the same time stamps can be attached as those recorded in the plurality of stream data playing devices, that is, time stamps continuous with one another can be attached. Therefore, stream data playback can be performed while continuity is maintained as in a similar manner to the case where all the recording data are recorded through the single stream data playback-controlling device.

The present invention provides, in still another aspect, a stream data-recording device for recording stream data into a recording medium, the stream data containing time information corresponding to reproduction timing and being input at timing corresponding to stream of reproduction time, comprising: an analyzing means for analyzing the input stream data and extracting recording data to be recorded in the recording medium or a recording medium in another stream data recording device; a time stamp-attaching means for generating a time stamp being controlled such that a time difference obtained by two pieces of time information contained in each of the recording data is equal to a difference between time stamps attached to the recording data that contain the two pieces of time information, and attaching the time stamp to the recording data; a recording means for recording a first recording data that is one of divided recording data into the recording medium; an output means for generating transfer stream data by removing the time stamp from a second recording data that is the other one of the divided recording data and is subsequent to the first recording data and outputting the generated transfer stream data to the other stream data recording device at timing corresponding to the time stamp; and a time stamp information-outputting means for outputting time stamp information corresponding to a relationship between the time stamp attached to the first recording data and the time stamp attached to the second recording data to the other stream data recording device.

It is preferable that in the foregoing stream data recording device, the time stamp information represents a difference between a time stamp attached to at least one of the head and the end of the first recording data and a time stamp attached to the head of the second recording data.

The present invention provides, in another aspect, a stream data-recording device for recording stream data into a recording medium, the stream data containing time information corresponding to reproduction timing and being input at timing corresponding to stream of reproduction time, comprising: an analyzing means for analyzing the input stream data and extracting recording data to be recorded in the recording medium or a recording medium in another stream data recording device; a time stamp-attaching means for generating a time stamp being controlled such that a time difference obtained by two pieces of time information contained in each of the recording data is equal to a difference between time stamps attached to the recording data that contain the two pieces of time information, and attaching the time stamp to the recording data; an output means for generating transfer stream data by removing the time stamp from a first recording data that is one of divided recording data, and outputting the generated transfer stream data to the other stream data recording device at timing corresponding to the time stamp; a recording means for recording a second recording data that is the other one of the divided recording data and is subsequent to the first recording data into the recording medium; and a time stamp information-holding means for holding time stamp information corresponding to the time stamp attached to the first recording data.

The present invention provides, in another aspect, a stream data playing device for playing back continuous stream data from first and second recording data to which continuous time stamps are attached and which are respectively recorded in a first recording medium in the stream data playing device and in a second recording medium in another stream data playing device, comprising: a playing means for reading out the first recording data from the first recording medium and outputting the first recording data as first playback output data; an analyzing means for analyzing transfer stream data that are generated by the other stream data playing device by reading out the second recording data from the second recording medium and removing the time stamp therefrom, and are output from the other stream data playing device at timing corresponding to the time stamp, and for extracting second playback output data; a time stamp-attaching means for setting as an initial value a time stamp obtained based on the relationship between the time stamps attached to the first and the second recording data when continuous time stamps are attached to the first and the second recording data and based on the time stamp attached to the first recording data, and attaching to the second playback output data a time stamp that is continuous with the time stamp attached to the first recording data; and an outputting means for generating playback stream data by removing the time stamps from the first and the second playback output data, and sequentially outputting the generated playback stream data at timing corresponding to the time stamps.

The present invention provides, in another aspect, a stream data playing device for playing back continuous stream data from first and second recording data to which continuous time stamps are attached and which are respectively recorded in a first recording medium in the stream data playing device and in a second recording medium in another stream data playing device, comprising: a playing means for reading out the first recording data from the first recording medium and outputting the first recording data as first playback output data; an analyzing means for analyzing transfer stream data that are generated by the other stream data playing device by reading out the second recording data from the second recording medium and removing the time stamp therefrom, and are output from the other stream data playing device at timing corresponding to the time stamp, and for extracting second playback output data; a time stamp-attaching means for generating a time stamp corresponding to timing of receiving the second playback output data, or a time stamp being controlled such that a time difference obtained by two pieces of time information contained in each of the second playback output data is equal to a difference between time stamps attached to second playback output data that contain the two pieces of time information, and attaching the time stamp to the second playback output data; and an outputting means for generating playback stream data by removing the time stamps from the first and the second playback output data, sequentially outputting the generated playback stream data at timing corresponding to the time stamps, and controlling the timing from the time when an end of one of the first or the second playback stream data is output until a head of the other one is output to be such a timing corresponding to the difference between a time stamp attached to the end of one of the first or the second playback stream data and a time stamp attached to the head of the other one when continuous time stamps are attached to the first and the second recording data.

The present invention provides, in another aspect, the outputting means outputs the playback stream data generated from the first playback output data after the playback stream data generated from the second playback output data have been output.

The present invention provides, in another aspect, a stream data recording-controlling device for controlling recording of stream data into a recording medium of a stream data recording device, the stream data containing time information corresponding to reproduction timing and being input at timing corresponding to stream of reproduction time, comprising: an analyzing means for analyzing the input stream data and extracting recording data to be recorded in the recording medium; a time stamp-attaching means for generating a time stamp being controlled such that a time difference obtained by two pieces of time information contained in each of the recording data is equal to a difference between time stamps attached to the recording data that contain the two pieces of time information, and attaching the time stamp to the recording data; an output means for generating transfer stream data by removing the time stamp from the recording data, and outputting the generated transfer stream data to the stream data recording device at timing corresponding to the time stamp; and a time stamp information-outputting means for outputting, to the stream data recording device, time stamp information corresponding to the relationship between a time stamp attached to the recording data for the transfer stream data and a time stamp attached to the recording data for transfer stream data that is continuous with the transfer stream data, or time stamp information corresponding to the time stamp attached to the recording data for the transfer stream data.

The present invention provides, in another aspect, a stream data playing method of playing continuous stream data from recording data to which continuous time stamps are attached and which are recorded into recording media of a plurality of stream data recording devices, comprising: a first extracting step of analyzing the input stream data and extracting recording data to be recorded in the recording medium; a first time stamp-attaching step of generating a time stamp being controlled such that a time difference obtained by two pieces of time information contained in each of the recording data is equal to a difference between time stamps attached to the recording data that contain the two pieces of time information, and attaching the time stamp to the recording data; an outputting step of dividing the recording data to which the time stamp is attached, generating transfer stream data by removing the time stamp from the divided recording data, and transferring the generated transfer stream data to the stream data recording device at timing corresponding to the time stamp; a time stamp information-acknowledging step of acknowledging, to the stream data recording devices, time stamp information corresponding to the relationship between time stamps attached to respective divided recording data, or corresponding to time stamps attached to respective recording data; a second extracting step of, in the stream data recording device to which the transferred stream data are input, analyzing the input stream data and extracting recording data to be recorded in the recording medium of the stream data recording device; a second time stamp-attaching step of generating a time stamp being controlled such that a time difference obtained by two pieces of time information contained in each of the recording data is equal to a difference between time stamps attached to the recording data that contain the two pieces of time information, and attaching the time stamp to the recording data; and a recording step of recording the recording data to which the time stamp is attached into the recording medium.

The present invention provides, in another aspect, a stream data playing method of playing continuous stream data from recording data to which continuous time stamps are attached and which are recorded into recording media of a plurality of stream data recording devices, comprising: a playing step of reading out the first recording data recorded in a recording medium of the first stream data recording device and outputting the data as the first playback output data; an outputting step of, in the second stream data recording device, reading out the second recording data recorded in the recording medium, and outputting transfer stream data generated by removing the time stamps at timing corresponding the time stamps; an extracting step of analyzing the transfer stream data that are output and extracting second playback output data; a time stamp-attaching step of setting as an initial value a time stamp obtained based on the relationship between the time stamps attached to the first and the second recording data when continuous time stamps are attached to the first and the second recording data and based on the time stamp attached to the first recording data, and attaching to the second playback output data a time stamp that is continuous with the time stamp attached to the first recording data; and an outputting step of generating playback stream data by removing the time stamps from the first and the second playback output data and sequentially outputting the generated playback stream data at timing corresponding to the time stamps.

The present invention provides, in another aspect, a stream data playing method of playing continuous stream data from recording data to which continuous time stamps are attached and which are recorded into recording media of a plurality of stream data recording devices, comprising: a playing step of reading out the first recording data recorded in a recording medium of the first stream data recording device and outputting the data as the first playback output data; an outputting step of, in the second stream data recording device, reading out the second recording data recorded in the recording medium, and outputting transfer stream data generated by removing the time stamps at timing corresponding the time stamps; an extracting step of analyzing the transfer stream data that are output and extracting second playback output data; a time stamp-attaching step of generating a time stamp corresponding to timing of receiving the second playback output data, or a time stamp being controlled such that a time difference obtained by two pieces of time information contained in each of the second playback output data is equal to a difference between time stamps attached to second playback output data that contain the two pieces of time information, and attaching the time stamp to the second playback output data; and an outputting step of generating playback stream data by removing the time stamps from the first and the second playback output data, sequentially outputting the generated playback stream data at timing corresponding to the time stamps, and controlling the timing from the time when an end of one of the first or the second playback stream data is output until a head of the other one is output to be such a timing corresponding to the difference between a time stamp attached to the end of one of the first or the second playback stream data and a time stamp attached to the head of the other one when continuous time stamps are attached to the first and the second recording data.

As described in these configurations, even when the time stamps attached during recording are not continuous, continuous time stamps can be attached to the transferred stream data or the output timing of the transferred stream data can be controlled, based on the already-attached time stamps during playback. Therefore, stream data can be played at proper timing while maintaining their continuity.

The present invention provides, in another aspect, a stream data-recording device for recording stream data into a recording medium, the stream data containing time information corresponding to reproduction timing and being input at timing corresponding to stream of reproduction time, comprising: an analyzing means for analyzing the input stream data and extracting recording data to be recorded in the recording medium or a recording medium in another stream data recording device; a time stamp-attaching means for generating a time stamp being controlled such that a time difference obtained by two pieces of time information contained in each of the recording data is equal to a difference between time stamps attached to the recording data that contain the two pieces of time information, and attaching the time stamp to the recording data; a recording means for recording a first recording data that is one of divided recording data into the recording medium; an output means for generating transfer stream data by removing the time stamp from a second recording data that is one of divided recording data and outputting the generated transfer stream data at timing corresponding to the time stamp to the other stream data recording device; and a time stamp information-outputting means for outputting time stamp information corresponding to the time stamp attached to the head of the second recording data to the other stream data recording device.

The present invention provides, in another aspect, a stream data-recording device for recording stream data into a recording medium, the stream data containing time information corresponding to reproduction timing and being input at timing corresponding to stream of reproduction time, comprising: an analyzing means for analyzing the stream data and extracting recording data to be recorded in the recording medium; a time stamp-attaching means for generating a time stamp being controlled such that a time difference obtained by two pieces of time information contained in each of the recording data is equal to a difference between time stamps attached to the recording data that contain the two pieces of time information, and attaching the time stamp to the recording data; a time stamp initial value-setting means for setting an initial value of the time stamp to be attached to the recording data by the time stamp-attaching means based on time stamp information corresponding to a predetermined time stamp; and a recording means for recording the recording data in the recording medium.

The present invention provides, in another aspect, a stream data recording-controlling device for controlling recording of stream data into a recording medium of a stream data recording device, the stream data containing time information corresponding to reproduction timing and being input at timing corresponding to stream of reproduction time, comprising: an analyzing means for analyzing the input stream data and extracting recording data to be recorded in the recording medium; a time stamp-attaching means for generating a time stamp being controlled such that a time difference obtained by two pieces of time information contained in each of the recording data is equal to a difference between time stamps attached to the recording data that contain the two pieces of time information, and attaching the time stamp to the recording data; an output means for generating transfer stream data by removing the time stamp from the recording data, and outputting the generated transfer stream data to the stream data recording device at timing corresponding to the time stamp; and a time stamp information-outputting means for outputting, to the stream data recording device, time stamp information corresponding to a time stamp attached to the head of the recording data for the transfer stream data.

The present invention also provides, in further another aspect, a stream data-recording method of recording stream data into a recording medium of a stream data recording device, the stream data containing time information corresponding to reproduction timing and being input at timing corresponding to stream of reproduction time, comprising: a first extracting step of analyzing the input stream data and extracting recording data to be recorded in the recording medium; a first time stamp-attaching step of generating a time stamp being controlled such that a time difference obtained by two pieces of time information contained in each of the recording data is equal to a difference between time stamps attached to the recording data that contain the two pieces of time information, and attaching the time stamp to the recording data; an outputting step of dividing the recording data to which the time stamp is attached, generating transfer stream data by removing the time stamp from the divided recording data, and transferring the generated transfer stream data to the stream data recording device at timing corresponding to the time stamp; a time stamp information-acknowledging step for acknowledging, to the stream data recording device, time stamp information corresponding to a time stamp attached to the head of each of the divided recording data; a second extracting step of, in the stream data recording device to which the transferred stream data are input, analyzing the input stream data and extracting recording data to be recorded in the recording medium of the stream data recording device; a second time stamp-attaching step of generating a time stamp being controlled such that a time difference obtained by two pieces of time information contained in each of the recording data is equal to a difference between time stamps attached to the recording data that contain the two pieces of time information, and attaching the time stamp to the recording data; a time stamp initial value-setting step of setting an initial value of the time stamp to be attached to the recording data by the time stamp-attaching means based on the time stamp information; and a recording step of recording the recording data to which the time stamp is attached into the recording medium.

BRIEF DESCRIPTION OF THE DRAWINGS

FIG. 23 is a block diagram showing the configuration of the controlling section of the controlling device.

DETAILED DESCRIPTION OF THE INVENTION

Embodiment 1

One embodiment according to the present invention is described below taking as an example a hard disk drive (hereinafter abbreviated as "HDD") that is a stream data recording and playing device, and a receiver recording and playing device that incorporates the stream data recording and playing device.

Figure 1:
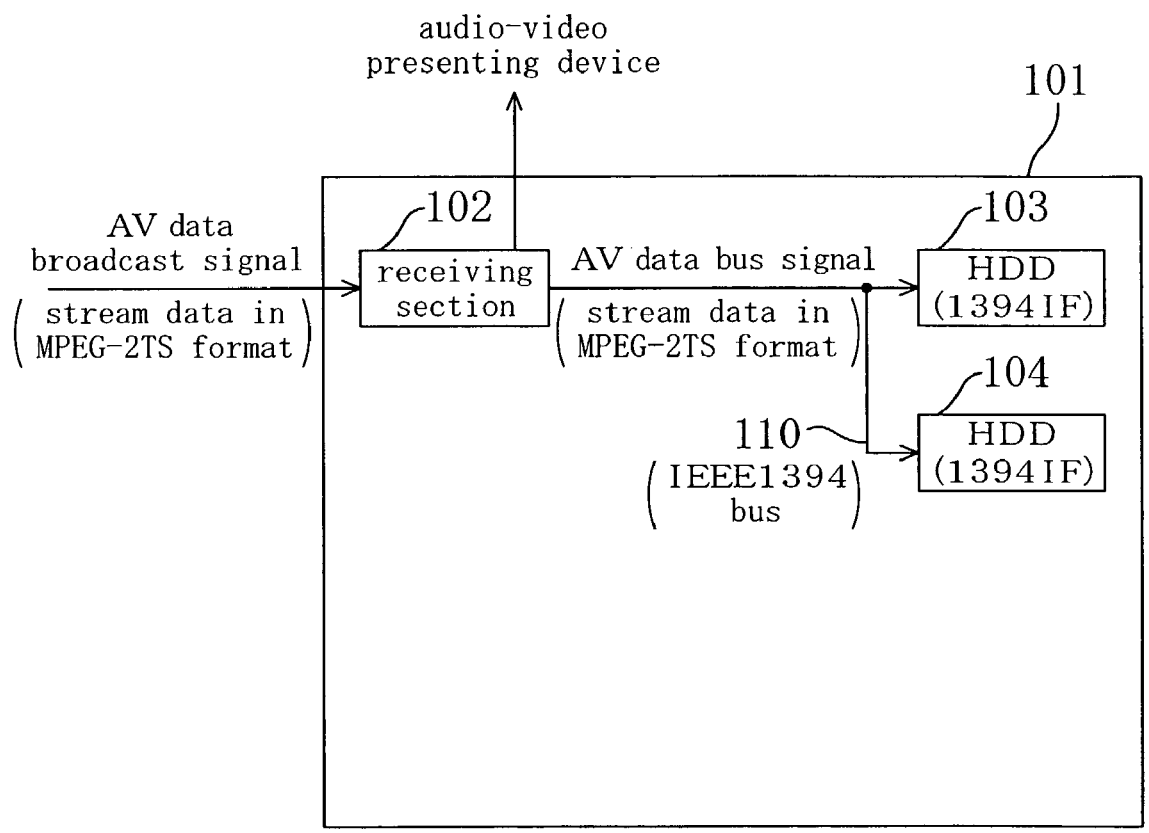
FIG. 1 is a block diagram showing the configuration of a primary portion of a receiver recording and playing device having stream data recording and playing devices (hard disk drives) according to Embodiment 1 of the present invention.

FIG. 1 is a block diagram showing a primary portion of the configuration of a receiver recording and playing device 101. The receiver recording and playing device 101 comprises a receiving section 102 to which a sound and image presenting device or the like is connected, and, for example, two HDDs 103 and 104. The receiving section 102 and the HDDs 103 and 104 are connected to each other via the IEEE 1394 standard bus 110 to form a network, so that AV data (audio video data) are transferred in the form of stream data by isochronous communication and commands and the like are transmitted and received using asynchronous communication.

Figure 2:
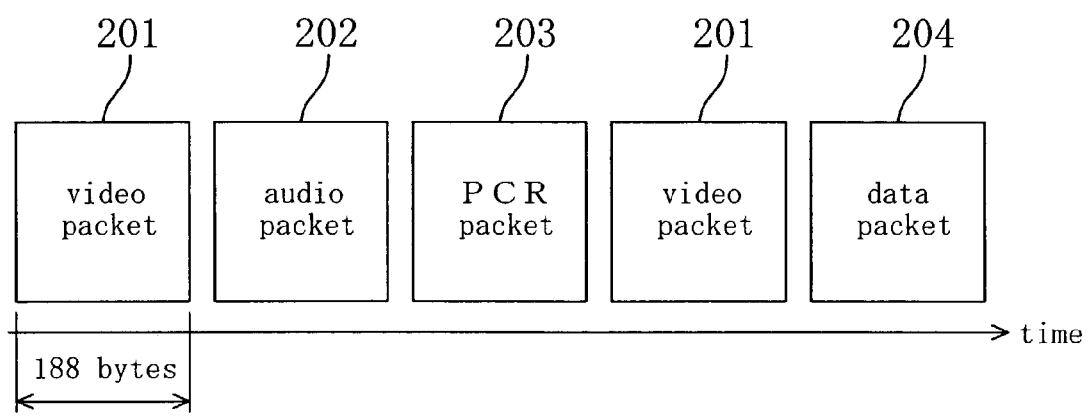
FIG. 2 is a diagram for illustrating a packet that is transmitted in the MPEG-2 TS format.

The receiving section 102 receives stream data of broadcast programs that are sent from broadcast stations or the like through broadcast radio waves, networks, or the like, and it outputs the data to the bus 110 through the IEEE 1394 standard interface. The format used for the stream data sent out from a broadcast station and the stream data transferred through the bus 110 is the MPEG-2TS format (MPEG-2 transport stream format). According to the MPEG-2TS format, as shown in FIG. 2, video data and audio data are transmitted in the units of 188-byte packets such as a video packet 201 and an audio packet 202, for example, as time elapses. A plurality of broadcast programs can be multiplexed in these packets, and each of the broadcast programs or the like is discerned with the use of PIDs (packet identifier) or the like contained in the packets. The packets to be transmitted contain such packets as a PCR packet 203 (Program Clock Reference Packet), which contains time information (hour information) for synchronizing the system time clock with a system time clock of the sending side, and a data packet 204.

Figure 3:
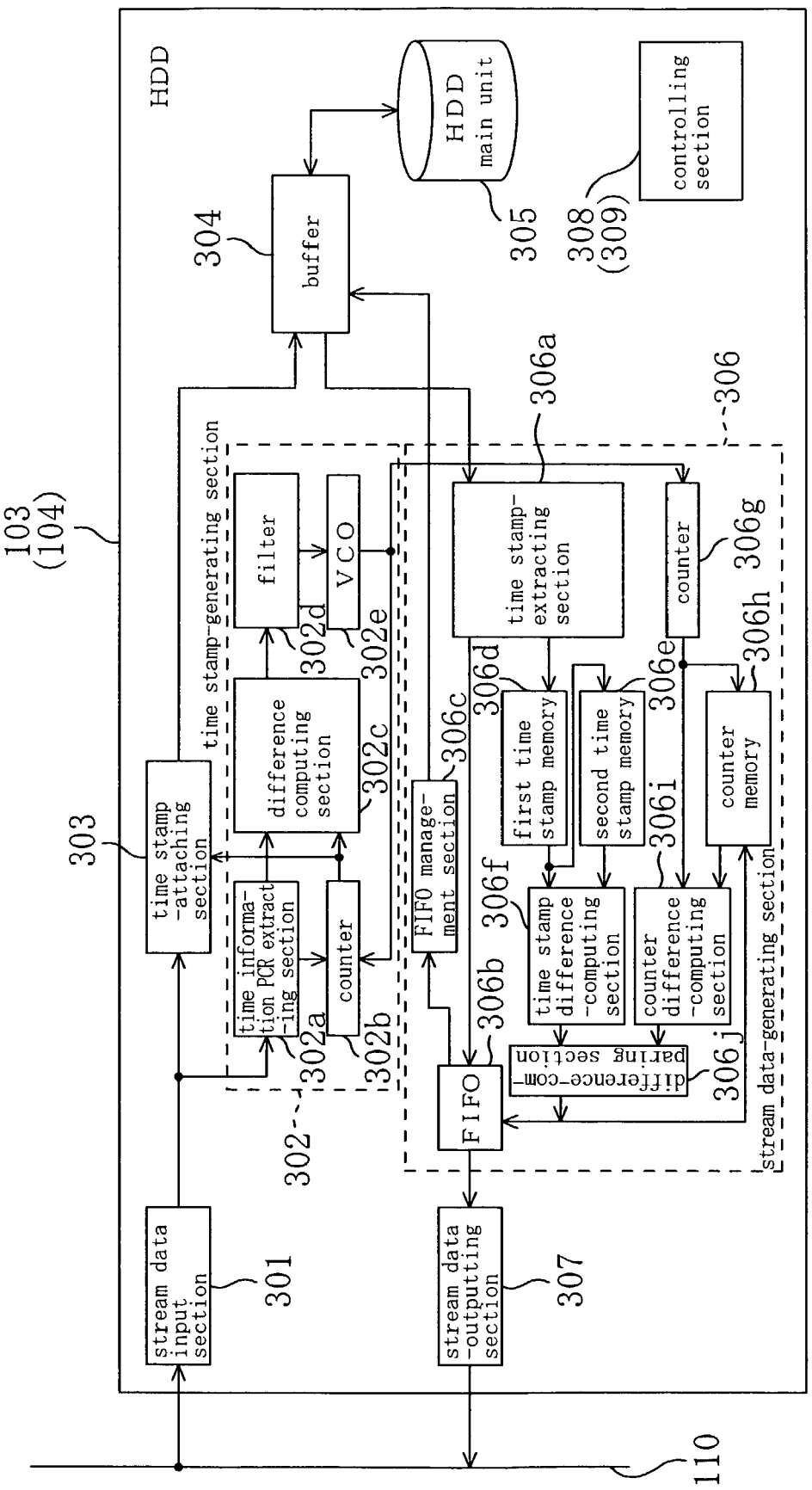
FIG. 3 is a block diagram showing the configuration of a hard disk drive according to Embodiment 1 of the present invention.

The HDDs 103 and 104 have IEEE 1394 interfaces and are for recording and playing the stream data. They have the same configuration except that the later-described controlling sections 308 and 309 are different. Specifically, as shown in FIG. 3, each of the HDDs comprises, for example, a stream data input section 301 (analyzing means), a time stamp-generating section 302 (part of time stamp-attaching means), a time stamp-attaching section 303 (part of time stamp-attaching means), a buffer 304, a HDD main unit 305 (recording means, playing means, and recording medium), a stream data-generating section 306 (output means, outputting means), a stream data-outputting section 307 (output means, outputting means), and a controlling section 308 or 309.

The stream data input section 301 analyzes the packets of the stream data (AV bitstream) that are transferred in the form of the MPEG-2TS format through the bus 110 so that it extracts and outputs the packets to be recorded in the HDD 103 (for example, video packets, audio packets, PCR packets, and the like of a predetermined broadcast program).

The time stamp-generating section 302 constitutes a PLL (Phase Locked Loop) circuit, and generates, for example, a 6 byte time stamp indicating the reproduction timing of each packet to be recorded in the HDD main unit 305, which is synchronized with the time information contained in the PCR packets that are output from the stream data input section 301. More specifically, the time stamp-generating section 302 comprises a PCR time information-extracting section 302a, a counter 302b, a difference-computing section 302c, a filter 302d, and a VCO (Voltage Controlled Oscillator) 302e. The PCR time information-extracting section 302a is for extracting time information contained in the PCR packet. The counter 302b is for counting reference clock inside the device with respect to an initial value that is the time information extracted initially (or at a predetermined timing) to output a time stamp. The difference-computing section 302c is for computing the difference between the values output from the PCR time information-extracting section 302a and the counter 302b. The filter 302d is for outputting a signal with a voltage corresponding to the difference that is output from the difference-computing section 302c. The VCO 302e is for generating the reference clock having a frequency corresponding to the signal output from the filter 302d.

The time stamp-attaching section 303 attaches a time stamp that is generated by the time stamp-generating section 302 to each packet that is output from the stream data input section 301.

The buffer 304 is for holding the packets that are output from, and to which a time stamp is attached by, the time stamp-attaching section 303 until they are written into the HDD main unit 305, and for holding the packets that are read out from the HDD main unit 305 until they are output to the stream data-generating section 306. In addition, the buffer 304 is so configured that it can output the packets that are output from the time stamp-attaching section 303 to the stream data-generating section 306 with or without writing the packets into the HDD main unit 305.

The HDD main unit 305 is for magnetically holding recording data into a recording medium and for outputting them. In this HDD main unit 305, the following information is also recorded, for example, as a HDD information section and a program information section, as needed.

HDD Information Section
(1) ID representing the HDD
(2) Free disk space
Program Information Section
For each entry corresponding to a program recorded:
(1) ID representing the program
(2) recorded location information of the program
(3) flag indicating that the recorded data is divided
(4) information indicating that the order of the data in the divided data
(5) ID of the HDD to which the divided data are stored
(6) difference value between the time stamp of the most leading packet and the time stamp to be attached to the most leading packet of the divided data The stream data-generating section 306 is for outputting the packet held in the buffer 304 at the timing corresponding to the time stamp attached to the packet. More specifically, the stream data-generating section 306 comprises a time stamp-extracting section 306a, a FIFO management section 306c, a FIFO management section 306c, a first time stamp memory 306d, a second time stamp memory 306e, a time stamp difference-computing section 306f, a counter 306g, a counter memory 306h, a counter difference-computing section 306i, and a difference-comparing section 306j. The time stamp-extracting section 306a extracts a time stamp from the packet output from the buffer 304 and outputs the packet from which the time stamp is removed. The FIFO 306b temporarily holds the packet from which the time stamp is removed. The FIFO management section 306c controls output timing of the packet from the buffer 304 to the time stamp-extracting section 306a so that the FIFO 306b does not overflow or underflow. The first time stamp memory 306d and the second time stamp memory 306e sequentially hold the time stamp extracted by the time stamp-extracting section 306a. The time stamp difference-computing section 306f computes the difference between the time stamps held in the time stamp memory 306d and 306e. The counter 306g counts the reference clock that is output from the VCO 302e. The counter memory 306h holds the value of the counter 306g at the time when the packet is output from the FIFO 306b. The counter difference-computing section 306i computes the difference between the values held in the counter 306g and the counter memory 306h.

The difference-comparing section 306j compares the differences computed by the time stamp difference-computing section 306f and the counter difference-computing section 306i, and when they match, it instructs the FIFO 306b to output the packet therefrom, the counter memory 306h to bold the value that is output from the counter 306g, and the time stamp memories 306d and 306e to update the time stamps that are output therefrom.

The stream data-outputting section 307 outputs the packets that are output from the FIFO 306b of the stream data-generating section 306 to the bus 110 in the form of stream data in the MPEG-2 TS format through the IEEE 1394 standard interface.

Figure 4:
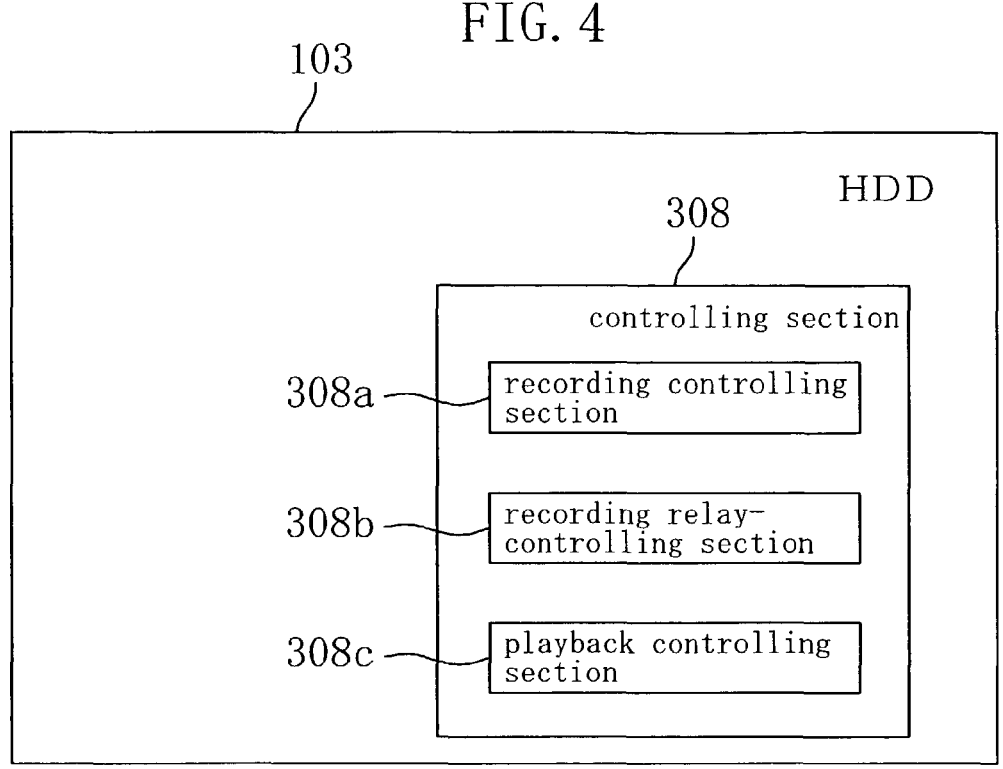
FIG. 4 is a block diagram showing the configuration of a controlling section in one of the hard disk drives.
Figure 5:
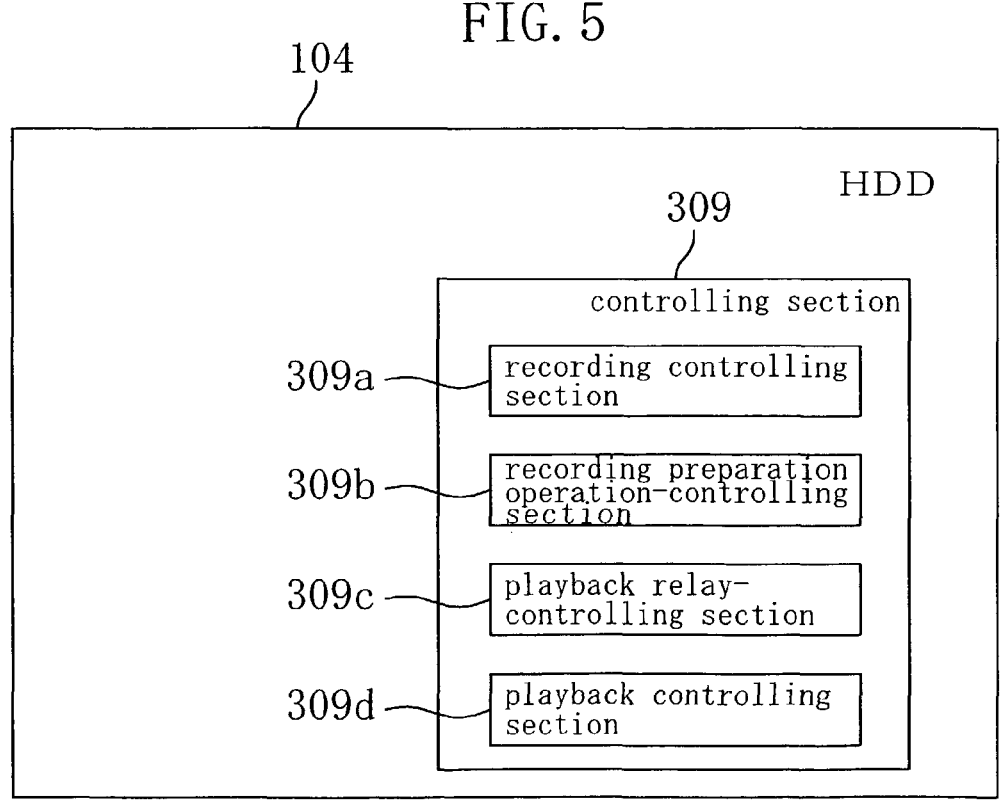
FIG. 5 is a block diagram showing the configuration of a controlling section in the other one of the hard disk drives.

The controlling sections 308 and 309 performs such operations as management of storage configuration (management of indexes, storage locations of entity data, or the like), management of available free storage space, and command processing with the receiving section 102 or the like; and at the same time, the controlling sections 308 and 309 controls split recording and playing across the HDDs 103 and 104 with data flow controls performed by the controlling sections shown in FIGS. 4 and 5, respectively.
(1) the controlling section 308 of the HDD 103 (FIG. 4)
    (a) recording-controlling section 308a time stamp-attaching section 303→buffer 304→HDD main unit 305
    (b) recording relay-controlling section 308b time stamp-attaching section 303→buffer 304→stream data-generating section 306
    (c) playback controlling section 308c HDD main unit 305→buffer 304→stream data-generating section 306
(2) the controlling section 309 of the HDD 104 (FIG. 5)
    (a) record controlling section 309a time stamp-attaching section 303→buffer 304→HDD main unit 305
    (b) recording preparation operation-controlling section 309b time stamp-attaching section 303→buffer 304→ (read but abandoned)
    (c) playback relay-controlling section 309c time stamp-attaching section 303→buffer 304→stream data-generating section 306
    (d) playback controlling section 309d HDD main unit 305→buffer 304→stream data-generating section 306

The record controlling section 308a and the record controlling section 309a have the same configuration, and so do the playback controlling section 308c and the playback controlling section 309d. The recording relay-controlling section 308b and the playback relay-controlling section 309c perform relay control of stream data to the other HDD during recording and playing, respectively, and the relay operations itself are similar. It should be noted that the control operations as described above can be achieved by various means including, but not limited to a software, for example.

In the following, first, a normal recording and playback operation of the receiver recording and playing device 101 for only the HDD 103 is described.

Normal Recording Operation to HDD 103

When the user carries out, for example, an instruction operation to record a desired broadcast program to the HDD 103, the receiving section 102 outputs received stream data to the HDD 103 via the bus 110. In the HDD 103, the stream data input section 301 analyzes the packets of the stream data sent from the receiving section 102 and outputs only the packets that should be recorded according to the user instruction.

The time stamp-generating section 302, first, starts to generate a time stamp according to time information indicated by the PCR packet that is output from the stream data input section 301, which is a recording preparation operation (time stamp synchronization operation). At the time of the recording preparation operation, a time stamp is attached to the packet output from the stream data input section 301 and is stored in the buffer 304, but recording into the HDD main unit 305 is not performed. Specifically, for example, false reading is performed by advancing a read pointer at the same time as the packets are written into the buffer 304 or at a predetermined timing. (It is possible that the time stamps are not attached, and it is also possible that the packets are not stored into the buffer 304. It is also possible that overwriting is performed for the same region while the write pointer is being fixed so that writing is not performed consequently.)

Later, when an accurate time stamp synchronized with the time information of the PCR packet starts to be generated, recording to the HDD main unit 305 is started. Specifically, the time stamp-attaching section 303 attaches time stamps to the packets. output from the stream data input section 301 that change over time according to the output timing thereof (that is, timing at which the receiving section 102 receives broadcast), and lets the buffer 304 temporarily hold the packets. The packets to which time stamps are attached can control output timing during playback according to the time stamps, as will be described in the following section that explains the playback operation. Therefore, the packets held in the buffer 304 can be recorded into the HDD main unit 305 in asynchronous with the timing at which the packets of stream data are output from the stream data input section 301.

Normal Playing Operation from HDD 103

When the user carries out, for example, an instruction operation for playing the recorded contents or the like, the packets recorded in the HDD main unit 305 are read out, then temporarily held in the buffer 304, and input to the time stamp-extracting section 306a, by the control of the FIFO management section 306c, at the timing such that the FIFO 306b does not overflow or underflow. The time stamp-extracting section 306a removes the time stamps attached to the packets that are input and outputs the packets to FIFO 306b, and it also extracts the time stamps and outputs the time stamps to the first time stamp memory 306d. The first time stamp memory 306d sequentially holds the time stamps that are output from the time stamp-extracting section 306a, and it outputs the time stamp that has been attached to the packet that is to be output next. The second time stamp memory 306e temporarily holds the time stamps that are output from the first time stamp memory 306d, and it outputs the time stamp that has been attached to the packet that has been output from the FIFO 306b most recently. The time stamp difference-computing section 306f computes the difference of two time stamps that are output from the time stamp memories 306d and 306e, which is the time difference from the time when the most recent packet is output until the next packet is output.

Meanwhile, the counter 306g counts the reference clock output from the VCO 302e, and the counter memory 306h holds the value of the counter 306g at the time when the most recent packet is output from the FIFO 306b. The counter difference-computing section 306i computes the difference between the value that is output from the counter 306g and the value held in the counter memory 306h, that is, the time elapsed from the time when the most recent packet has been output.

The difference-comparing section 306j compares the difference that is output from the time stamp difference-computing section 306f and the difference that is output from the counter difference-computing section 306i, and instructs the FIFO 306b to output the next packet at the timing at which the differences match, that is, at the time when the time that is equal to the difference in the time stamps has elapsed from the time when the most recent packet is output. The difference-comparing section 306j also instructs the counter memory 306h and the time stamp memories 306d and 306e to update the values that are held therein. The way of controlling the timing of outputting packets is not limited to the above-described manner in which the difference in the time stamps are used for the control. For example, it is also possible that the time stamp that is attached to the packet that is sent out first is assigned as the initial value of the counter 306g and, subsequently, each time when the time stamp attached to a subsequent packet matches the value in the counter 306g, the packet is output.

The stream data-outputting section 307 outputs the packets that are output from the FIFO 306b to the bus 110 in the form of stream data in the MPEG-2 TS format through the IEEE 1394 standard interface. As described above, since the output timing is controlled according to time stamps, each packet of the stream data is output at the same timing as it is input into the stream data input section 301. Therefore, images and sound are properly presented by the presenting device, which is not shown the drawings, through the receiving section 102.

Separate Recording Operation to HDDs 103 and 104

The following describes an operation in which stream data received by the receiving section 102 are divided and recorded into the HDD 103 and subsequently into the HDD 104.

First, a summary is given. All the packets of the stream data that are output from the receiving section 102 are temporarily input into the HDD 103, and then only the packets to be recorded are extracted and time stamps are attached thereto. Of the packets to which the time stamps are attached, some of the packets are recorded into the HDD main unit 305 of the HDD 103. Regarding the remaining packets, the time stamps are removed therefrom, and they are output again as stream data at the timing according the time stamps, which are then sent to the HDD 104 and recorded into the HDD main unit 305 of the HDD 104. Also, some of the last packets to be recorded into the HDD main unit 305 of the HDD 103 are sent to the HDD 104 as the packets for a recording preparation operation, and in the HDD 104, and prior to the start of recording, a recording preparation operation is performed according to the packets for the recording preparation operation. This recording preparation operation ensures continuity of time stamps that are attached to the packets to be recorded into the HDDs 103 and 104.

In other words, because all the packets are temporarily input into the HDD 103 and then only the packets to be recorded are extracted, it is possible to distinguish between the packets that can be recorded into a free space in the HDD 103 or a free space in a region that is reserved for recording in advance and the packets to be recorded into the HDD 104. Thus, it is possible to divide and record the data without causing data overlapping or data loss. Moreover, because the packets to be recorded into the HDD 104 are sent from the HDD 103 to the HDD 104 in the form of stream data based on the time stamps, it is possible for the HDD 104 to attach time stamps data and record the data so that they can be played at proper timing, as in the case where the data are directly sent from the receiving section 102. Furthermore, because the recording preparation operation ensures continuity of the time stamps, it is easy to carry out proper playback in which time continuity is maintained even at joints of the packets output from the HDDs 103 and 104 during playback.

Figure 6A:
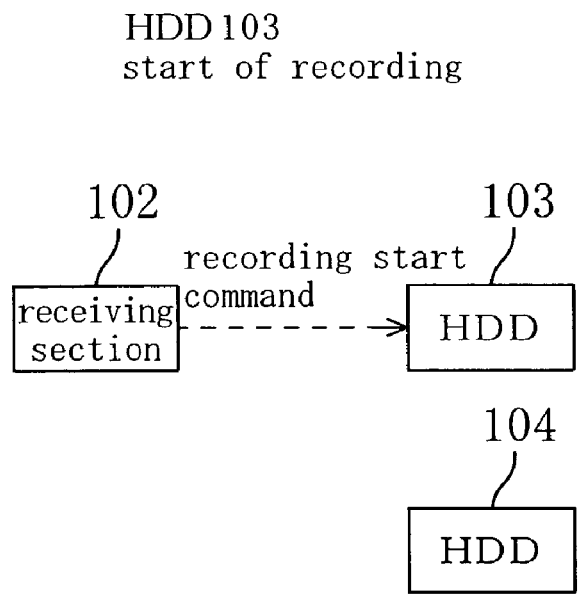
FIGS. 6A and 6B are diagrams for illustrating commands that are transmitted and received during recording.

In the following, specific operations of various portions are described. First, recording to the HDD main unit 305 of the HDD 103 is performed in a similar manner to the normal recording described above. Specifically, for example as shown in FIG. 6A, when a recording start command is issued from the receiving section 102 to the HDD 103, time stamps are sequentially attached to the packets that are sent from the receiving section 102 thereafter and output from the stream data input section 301. Then the packets are temporarily held in the buffer 304 and thereafter recorded into the HDD main unit 305.

Figure 6B:
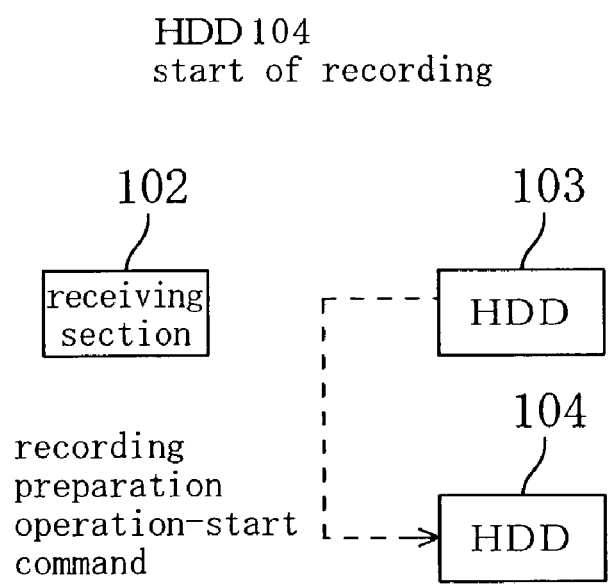
Figure 7A:
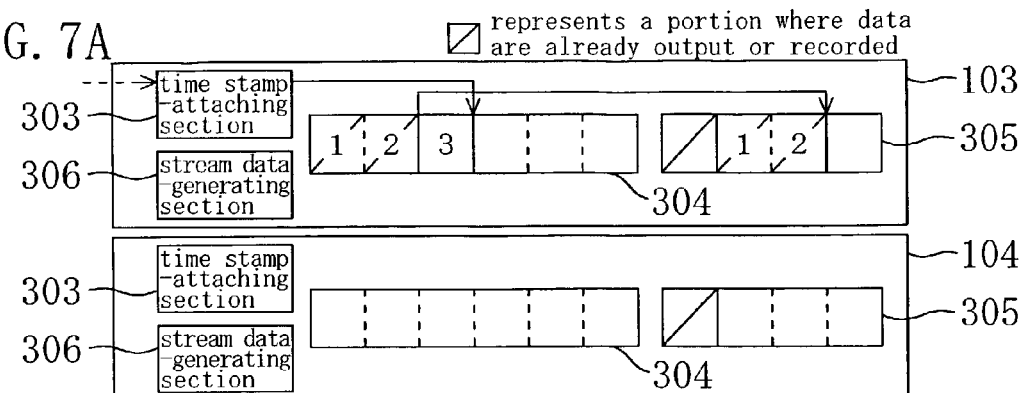
FIGS. 7A to 7D are diagrams for illustrating the recording operation.
Figure 7B:
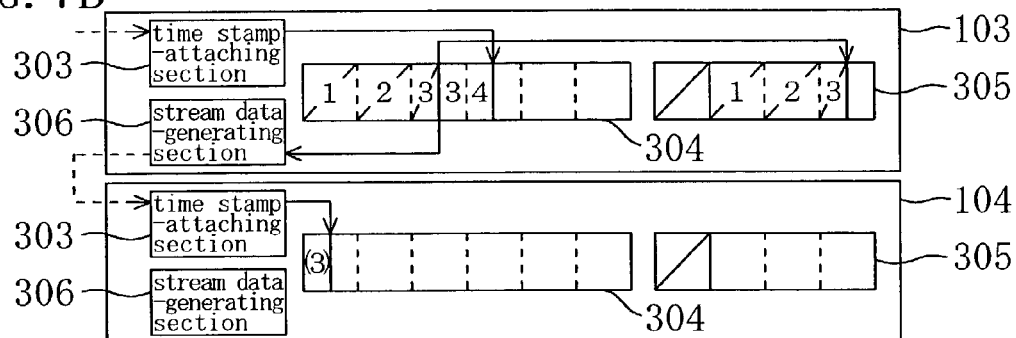

However, as shown in FIG. 7A, if the free space in the HDD main unit 305 becomes a predetermined amount, for example, the minimum recording unit amount or a predetermined amount of packets, data transfer for the recording preparation operation to the HDD 104 is started, as well as the recording into the HDD main unit 305 of HDD 103. Specifically, first, as shown in FIG. 6B, a recording preparation operation start command is issued from the HDD 103 to the HDD 104 using asynchronous communication or the like. (It should be noted that it is possible that the receiving section 102 or the HDD 103 issue the recording preparation operation start command at the start of the recording into the HDD 103 or the like so that the HDD 104 becomes a stand-by state, if it is known in advance that data are to be divided and recorded into the HDDs 103 and 104.) Thereafter, as shown in FIG. 7B, the predetermined amount of packets to be recorded last into the free space is output from the buffer 304 and recorded into the HDD main unit 305, and at the same time, the packets are also output to the stream data-generating section 306 as the packet for the recording preparation operation of the HDD 104. More specifically, the buffer 304 outputs the packets held therein to the HDD main unit 305 according to the read pointer for outputting for recording into the HDD main unit 305, and at the same time, it also outputs the packets to the stream data-generating section 306 according to another read pointer to the pointer for recording at the timing controlled by the FIFO management section 306c of the stream data-generating section 306. Time stamps are removed from the packets that are input into the stream data-generating section 306 in a similar manner to the case of the foregoing normal playback operation, and according to the timing based on the time stamps, the packets are transferred in the form of stream data to the HDD 104 through the stream data-outputting section 307. It should be noted that control of the timing at which the transfer is started is relatively easy if the transfer to the HDD 104 is started at the time when the free space of the HDD main unit 305 reaches a predetermined amount, as described above. However, it is not so limited, and it is sufficient as long as the transfer is started at the timing by which the buffer 304 does not cause an overflow or underflow.

In the HDD 104, first, a recording preparation operation similar to the case of the above-described normal recording is performed for the predetermined amount of the packets for the recording preparation operation that are transferred from the HDD 103 and are output from the stream data input section 301. Specifically, the time stamp-generating section 302 starts to generate time stamps based on the time information indicated by the PCR packet contained in the stream data from the HDD 103, and the system time clock is synchronized with the HDD 103 so that the same time stamps are generated as those attached to the packets in the HDD 103. At the time of this recording preparation operation, time stamps are attached to the packets that are output from the stream data input section 301 and the packets are stored in the buffer 304 (see FIG. 7B), but the packets are not recorded in the HDD main unit 305. (In this case as well, it is not essential to attach time stamps or store the packets into the buffer 304, as described in the foregoing section where the recording operation is explained.) The difference from the recording preparation operation in the normal recording operation is that its recording preparation operation is performed corresponding accurately to the predetermined amount of packets for the recording preparation operation that are sent from the HDD 103, and thereafter, the operation is performed such that the packets sent from the HDD 103 are actually recorded into the HDD main unit 305. As a consequence, recording of continuous data free from data overlap and data loss is possible in the HDDs 103 and 104. It should be noted that the "predetermined amount" of packets for the recording preparation operation is not particularly limited as long as it is a sufficient amount for the time stamp-generating section 302 to synchronize the system time clock (for example, an amount such that a PCR packet is always contained). However, it is necessary that the number of packets that are recorded in the HDD 103 and are output to the HDD 104 matches the number of packets that are used by the HDD 104 for the recording preparation operation but are not recorded therein. In order to achieve this, a certain predetermined amount may be determined in advance, or a predetermined amount may be acknowledged between HDDs 103 and 104 when starting up the device or at the time of starting the recording or the recording preparation operation. Or a predetermined amount may be set according to instruction from other devices such as the receiving section 102 or the like.

Figure 7C:
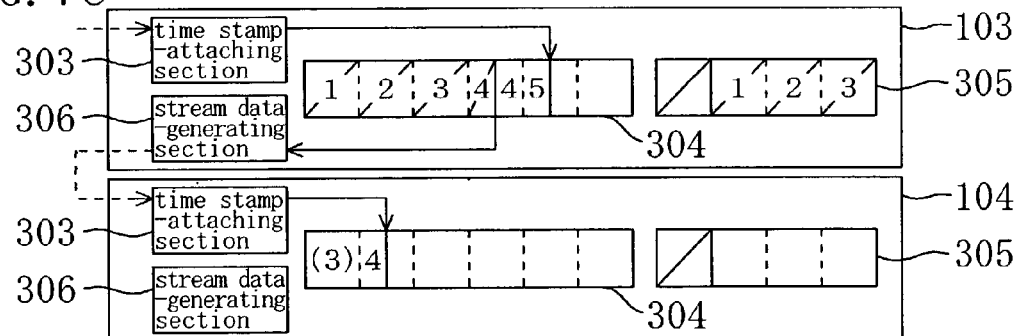
Figure 7D:
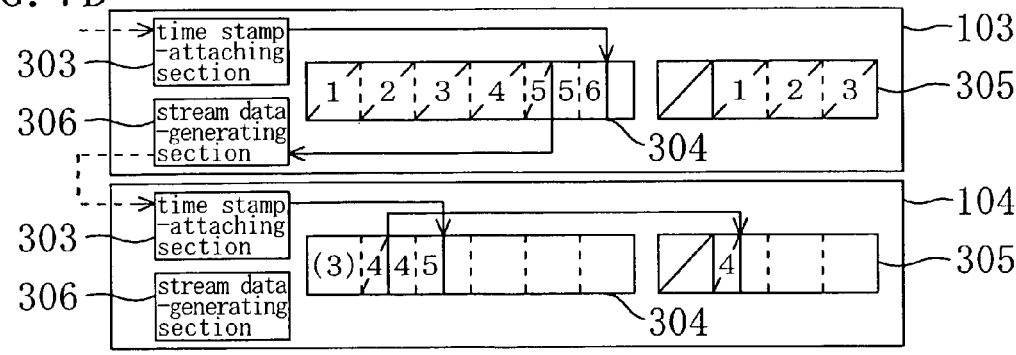

The HDD 103 continues only the transfer (relay) of packets as shown in FIG. 7C after recording of the predetermined amount of packets has been completed. The HDD 104 attaches time stamps to the packets transferred subsequent to the packets for recording preparation operation and temporarily stores them in the buffer 304, as in the case of the normal recording operation. After a certain amount of packets are stored therein, the HDD 104 records the packets into the HDD main unit 305 one after another, as shown in FIG. 7D.

It should be noted that management of recorded contents that are split-recorded in the above-described manner can be easily performed by, although not limited thereto, providing managing information indicating relevance and sequence of recorded contents recorded into the HDDs 103 and 104, for example. In addition, such management may be carried out by any of the receiving section 102, HDDs 103 and/or 104, and other controlling devices.

Linked Playing Operation from HDDs 103 and 104

This section describes an operation in which the stream data split-recorded into the HDDs 103 and 104 are played back.

First, a summary is given. In this playback operation, the packets recorded in the HDD 103 go through the HDD 104 and are then output to the receiving section 102 (and subsequently to a presenting device or the like, which is not shown in the drawings). More specifically, first, the packets read out from the HDD main unit 305 of the HDD 103 are subjected to the removal of time stamps and the timing control according to the time stamps, and are temporarily transferred to the HDD 104 as stream data. To the transferred packets, time stamps are once again attached in the HDD 104 in a similar manner to that in the recording, then the packets are temporarily held in the buffer 304 and further subjected to removal of time stamps and timing control according to the timing stamps. Then, the packets are output and sent to the presenting device or the like through the receiving section 102. Meanwhile, the packets recorded in the HDD main unit 305 of the HDD 104 are read out from the HDD main unit 305 subsequently to the packets that are transferred from the HDD 103 and held in the buffer 304, are held in the buffer 304, and are output under a similar timing control.

Thus, the packets recorded in the HDD 103 are transferred to the HDD 104 as stream data under the timing control according to the time stamps, and thereby, time stamps that are continuous with those of the packets recorded in the HDD 104 can be once again attached to the transferred packets. In other words, all the packets can be handled as if they are recorded in the HDD 104, and therefore, they can be easily output as continuous stream data.

Figure 8A:
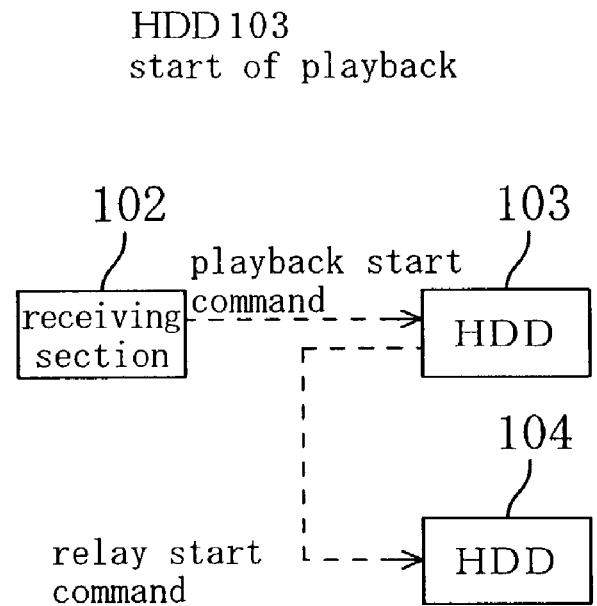
FIGS. 8A and 8B are diagrams for illustrating commands that are transmitted and received during playback.
Figure 9A:
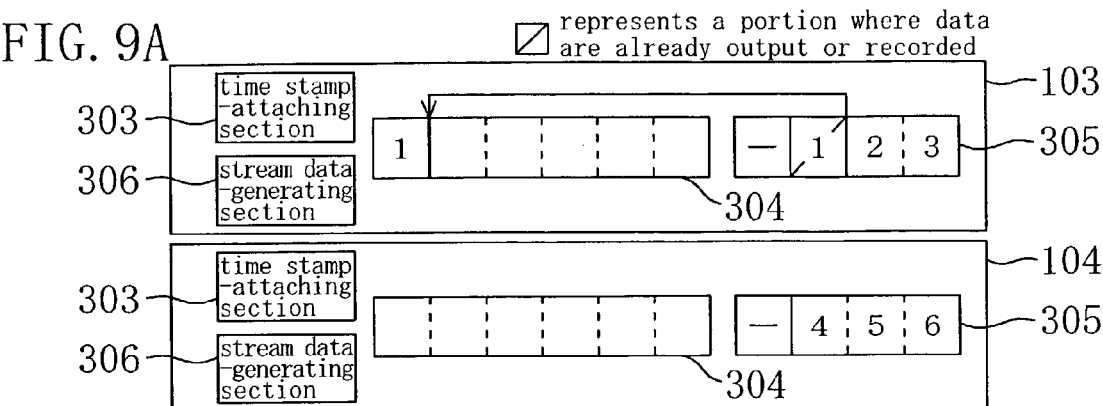
FIGS. 9A to 9D are diagrams for illustrating the playback operation.

Now, specific operations of various portions are described below. For example, as shown in FIG. 8A, when a playback start command is issued from the receiving section 102 to the HDD 103, first, the stream data recorded in the HDD 103 are played back, as in the case of the above-described normal playing operation. Specifically, as shown in FIG. 9A, the packets recorded in the HDD main unit 305 are read out and temporarily held in the buffer 304.

Figure 9B:
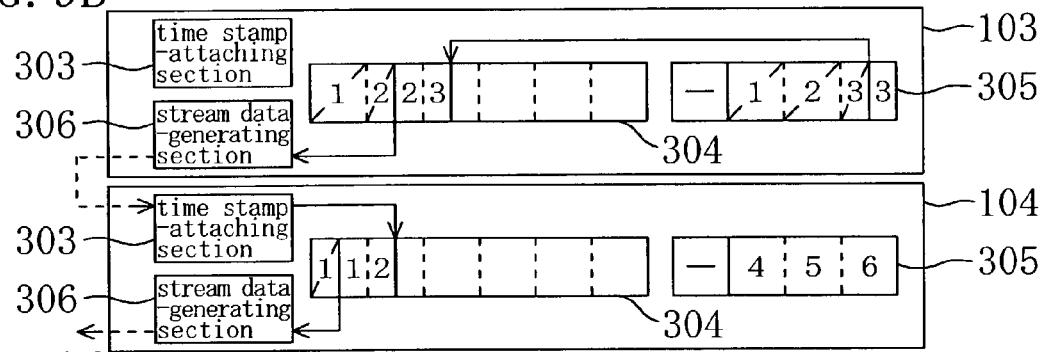

As shown in FIG. 9B, the packets held in the buffer 304 are input into the stream data-generating section 306, time stamps are removed therefrom, and the packets are output from the stream data-outputting section 307 at the timing based on the time stamps, in the form of stream data. It should be noted that the differences from the normal playback operation are that the output destination is the HDD 104, not the receiving section 102 (AV data presenting device), that a relay start command is issued from the HDD 103 to the HDD 104 prior to the output, as also shown in FIG. 8A, and that at least one PCR packet is generated in the HDD 103 for synchronizing the system time clock between the HDDs 103 and 104, for example, in the output. (It should be noted, however, that, if the HDD 103 has a configuration such that a PCR packet or the like, which is a packet containing time information, becomes the most leading packet during recording, the recorded packets may be output as they are.)

In the HDD 104, first, time stamps start to be generated according to the PCR packet or the like as in a similar manner to that during recording, and then, the time stamps are sequentially attached to the packets that are transferred from the HDD 103 and are output from the stream data input section 301, after which the packets are temporarily held in the buffer 304. Here, the time stamps attached to the packets are the same time stamps as those attached when recorded in the HDD main unit 305 of the HDD 103, as the packets are transferred from the HDD 103 in the form of stream data. The packets held in the buffer 304 are then output to the stream data-generating section 306, and the time stamps are again removed therefrom. Then, they are output as stream data and sent to the presenting device or the like through the receiving section 102.

Figure 9C:
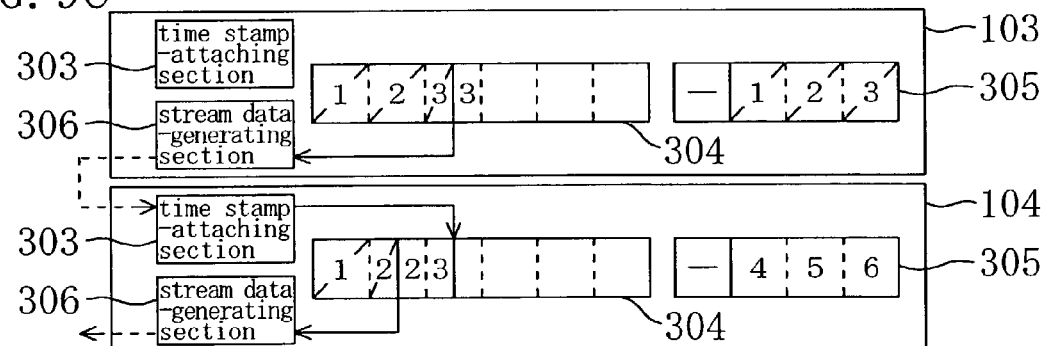

Thereafter, as shown in FIG. 9C, the HDD 103 reads out packets from the HDD main unit 305 up to the last packet recorded in the HDD main unit 305, and transfers them to the HDD 104, which relays the transferred packets.

Figure 8B:
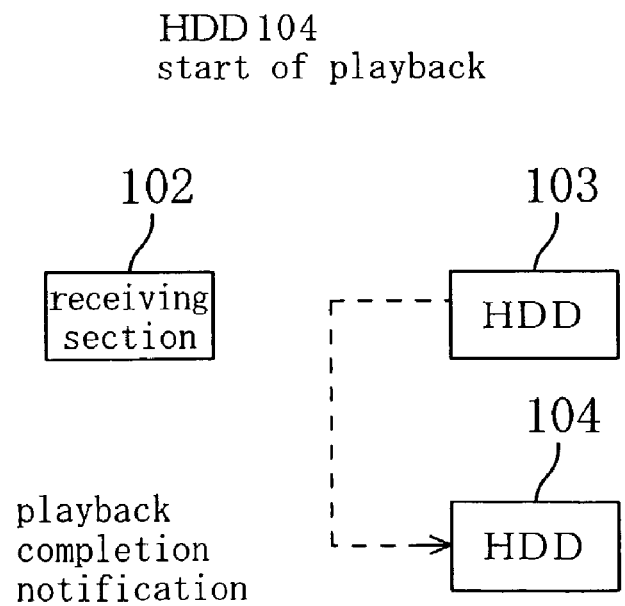
Figure 9D:
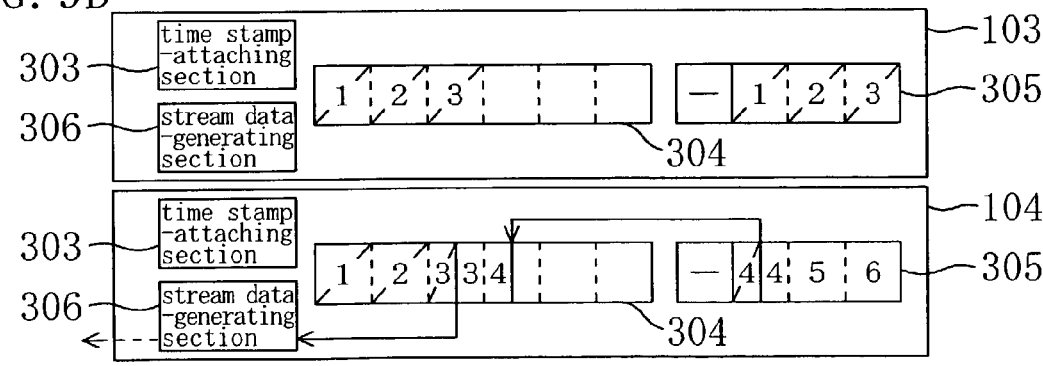

After that, when the transfer from the HDD 103 is completed, first, as shown in FIG. 8B, a playback completion notification (relay end/self-playback start command) is sent from the HDD 103 to the HDD 104, for example, using asynchronous communication. The reason why the notification can be made using asynchronous communication is that the amount of data transferred from the HDD 103 to the HDD 104 is a multiple of the minimum recording unit of the HDD 103, and therefore, if the notification can be made at timing within the range in which data of the minimum recording unit are transferred, the HDD 104 can detect the end of the transferred data. It should be noted that such a playback completion notification is described for illustrative purposes only. For example, it is possible that the HDD 104 is notified of the amount of data to be transferred from the HDD 103 in advance and the HDD 104 counts the amount of data that have actually been transferred. When the transfer from the HDD 103 is completed, the packets recorded in the HDD main unit 305 start to be read out in the HDD 104, as shown in FIG. 9D, and the read packets are held in the buffer 304.

Here, the time stamps of the packets that are transferred from the HDD 103 and held in the buffer 304 are, as described above, the same time stamps as those when recorded in the HDD main unit 305 of the HDD 103, and therefore, the time stamp of the packet that is read out first from the HDD main unit 305 of the HDD 104 and held in the buffer 304 is continuous with the time stamp of the packet that is transferred last from the HDD 103 and held in the buffer 304. As a consequence, the first packet recorded in the HDD 104 is output from the HDD 104 subsequently to the last packet recorded in the HDD 103 at proper timing, and thus, it is possible to present continuous stream data with a presenting device or the like.

Command Control

In the foregoing example, the commands issued from the receiving section 102 during the split recording and combined playing are the recording start command for the split recording or the playback start command for combined playing for the HDD 103 for convenience. However, it is possible that the receiving section 102 may issue the same recording start command or the playback start command as those for the normal recording or the normal playing and the HDD 103 side may voluntarily issue a recording preparation operation start command to the HDD 104 to start data transfer if available free space has been used up by the time the recording is instructed to stop, or the HDD 103 may voluntarily issue a relay start command or the like to the HDD 104 if the stream data that are instructed to play have been subject to the split recording. Insofar as the HDDs 103 and 104 having the above-described configuration are employed, the receiving section 102 may have the same configuration regardless of whether or not the split recording and the combined playing is performed.

Figure 10:
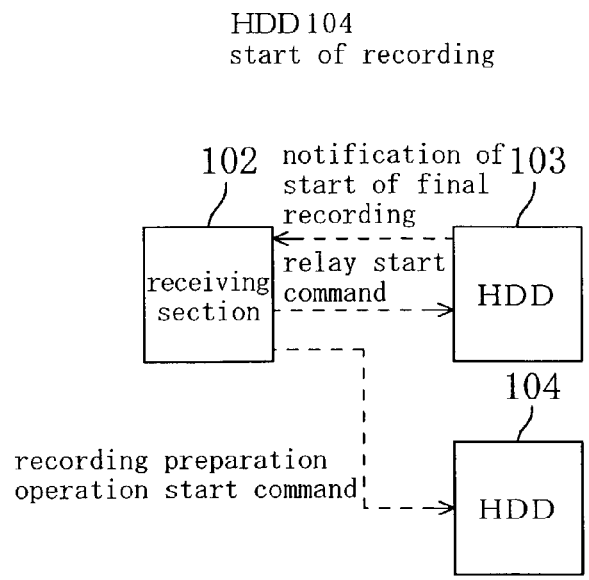
FIG. 10 is a diagram for illustrating other commands that are transmitted and received during recording.
Figure 11A:
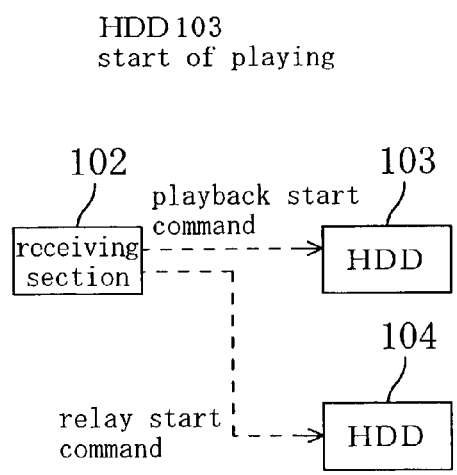
FIGS. 11A and 11B are other commands that are transmitted and received during playback.
Figure 11B:
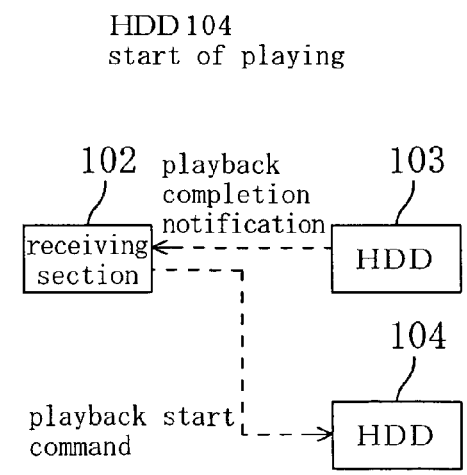

The above-described example is not the only case where the receiving section 102 can perform a different operation from that during the normal recording and playing, (or the case where a controlling section or the like that performs command control is provided separately from the receiving section 102). For example, the following is possible. For recording, as shown in FIG. 10, when the free space in the HDD 103 reaches a predetermined amount, a final recording start notification is issued from the HDD 103 to receiving section 102 and in response to this, the receiving section 102 issues a relay start command to the HDD 103 and a recording preparation operation start command to the HDD 104. For playing, as shown in FIG. 11A, the receiving section 102 issues a playback start command to the HDD 103 and a relay start command to the HDD 104 at the start of playback, whereas, as shown in FIG. 11B, the HDD 103 issues a playback completion notification to the receiving section 102 when the HDD 103 completes playing, and in response to this, the receiving section 102 issues a playback start command to the HDD 104.

The above-described example describes commands and notifications that control the operations of the HDDs 103 and 104 as a whole, but it is also possible to use combinations of commands that instruct operations of various portions thereof such as the buffer 304. An example is as follows. When recording in the HDD 104 is started in the split recording, the HDD 103 performs a relay operation according to a storing command from the time stamp-attaching section 303 to the buffer 304 and a reading command from the buffer 304 to the stream data-generating section 306 while the HDD 104 performs a recording operation according to a storing command from the time stamp-attaching section 303 to the buffer 304 and a recording command from the buffer 304 to the HDD main unit 305. When the control can be performed using such commands for buffer operation or the like, it is also possible to easily increase versatility and operation flexibility of the HDD 103 or the like.

Embodiment 2

Figure 12:
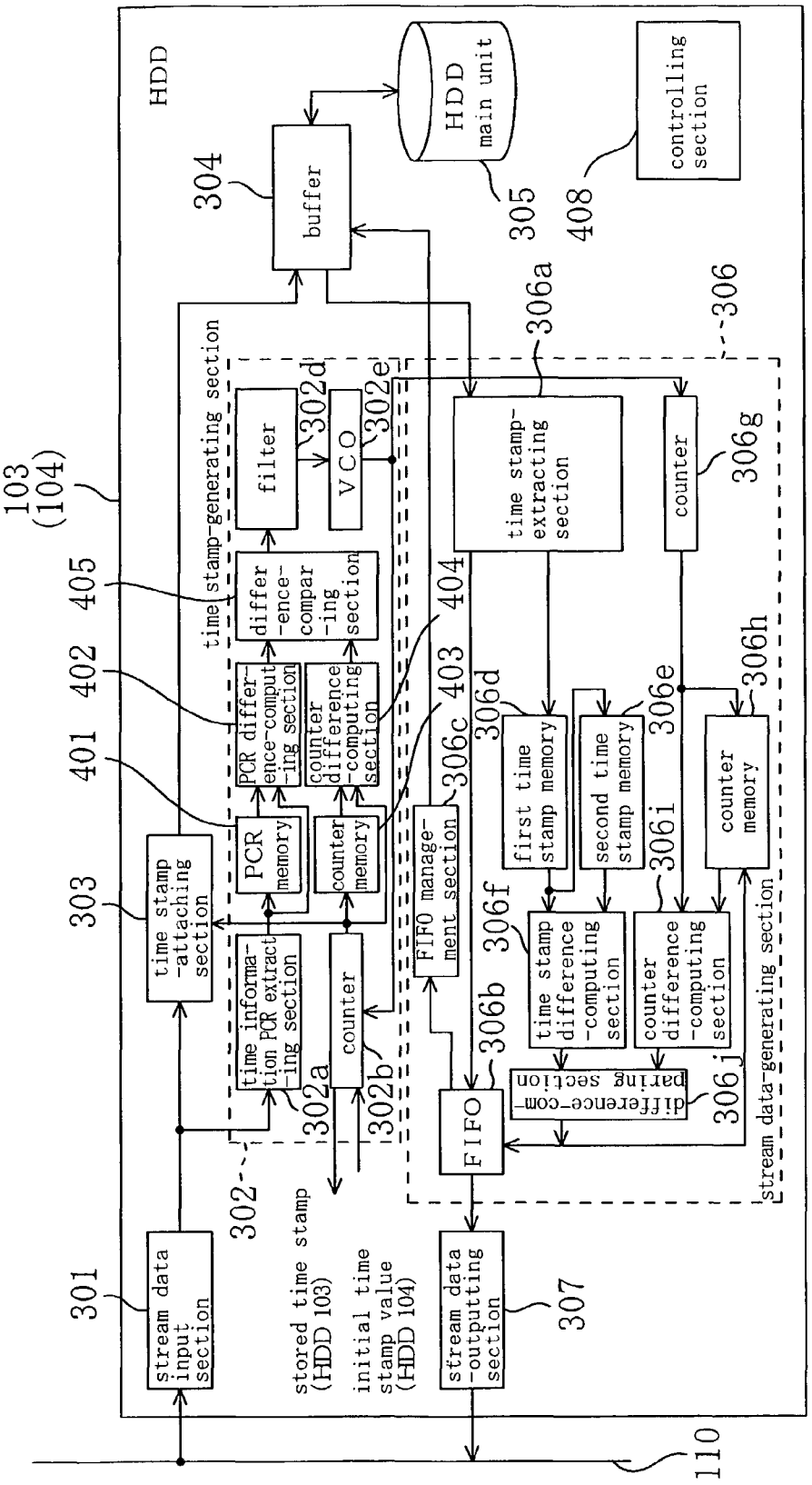
FIG. 12 is a block diagram showing the configuration of a hard disk drive according to embodiment 2 of the present invention.

A stream data recording and playing device according to Embodiment 2 is described with reference to FIG. 12. In this recording and playing device, time stamps attached to the packets that are recorded in the HDDs 103 and 104 are not continuous between the HDDs 103 and 104 unlike the foregoing example, but continuous stream data can be output because continuous time stamps are attached in the HDD that relays the packets during playback. It should be noted that in the following embodiments and variations, the parts and elements that have similar functions to those described in the foregoing Embodiment 1 and elsewhere are denoted by same reference characters, and are not further elaborated upon.

This stream data recording and playing device mainly differs from the configuration of the foregoing Embodiment 1 (FIG. 3) in that it comprises a PCR memory 401, a PCR difference-computing section 402, a counter memory 403, a counter difference-computing section 404, and a difference-comparing section 405 in place of the difference-computing section 302c, and comprises a controlling section 408 in place of the controlling section 308.

The PCR memory 401 holds time information contained in a PCR packet that is extracted by the PCR time information-extracting section 302a most recently in order to compute the difference from time information contained in a PCR packet that is extracted next.

The PCR difference-computing section 402 computes the difference between the time information output from the PCR time information-extracting section 302a and the time information output from the PCR memory 401.

The counter memory 403 holds the value of the counter 302b at the time when a PCR packet is extracted most recently in order to compute the difference from the value of the counter 302b at the time when a PCR packet is extracted next.

The counter difference-computing section 404 computes the difference between the value that is output from the counter 302b at the time when the next PCR packet is extracted and the value held in the counter memory 403.

The difference-comparing section 405 outputs the difference between the difference output from the PCR difference-computing section 402 and the difference output from the counter difference-computing section 404.

The controlling section 408 performs a control operation during recording and playing that is different from the operation performed by the foregoing controlling section 308 and so forth, which will be detailed later.

The counter 302b is configured to output the holding value as a storing time stamp and hold a predetermined value as an initial time stamp value under the control of the controlling section 408.

The stream data recording and playing device thus configured, the flow of packets during recording and playback is the same as that illustrated in the foregoing FIGS. 7 and 9, but handling of time stamps attached to the packets is different.

Specifically, when recording is performed, time information contained in the PCR packet and the value of the counter 302b are not compared unlike the foregoing Embodiment 1. Instead, the difference between two pieces of time information contained in the successive PCR packets and the difference in the values of the counter 302b at the time when these PCR packets are input into the time stamp-attaching section 303 are compared, and a PLL operation is performed so that those differences match. Accordingly, the initial value of the time stamp may be any values, and each time stamp value attached to each packet becomes independent from the time information indicated by the PCR packet as described above.

Figure 13A:
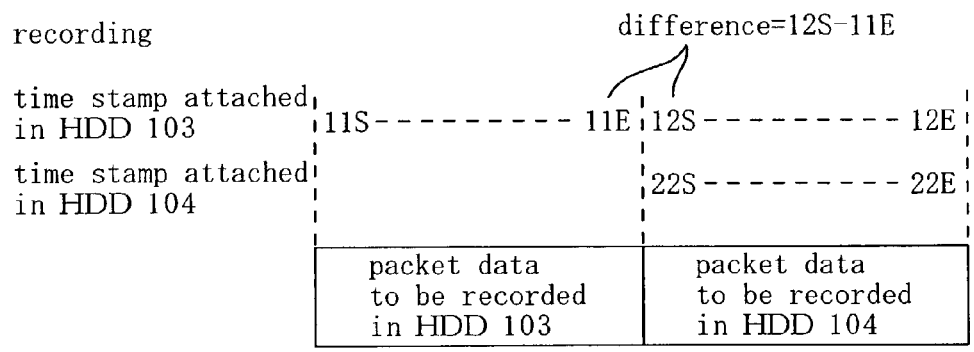
FIGS. 13A and 13B are diagrams for illustrating time stamps that are attached to the packets.

Specifically, for example as shown in FIG. 13A, in the HDD 103, time stamps whose values are 11S to 11E are attached to the packets to be recorded in the HDD 103, whereas time stamps whose values are 12S to 12E are attached to the packets to be recorded in the HDD 104. These time stamps are continuous but independent of the time information of the PCR packet.

Also, when the time stamps are attached in the HDD 103 as described above, time stamp values 11S and 12S of the most leading packets that are respectively to be recorded in the HDDs 103 and 104 are read out from the counter 302b by the controlling section 408, and the difference therebetween (12S-11S) is held in the HDD main unit 305 together with, for example, a device ID, which indicates, for example, that the destination to be stored is the HDD 104. The HDD 104 is notified of the held value during playing, as will be described later. (It is also possible that the notification may be made during recording and the value held in the HDD 104, or that it may be temporarily held in a server device or the like and then the HDD 104 may be notified. The value to be notified of is not limited to the above-described example, but it is sufficient that it is substantially such information that the relationship of time stamps of the packets recorded in the HDDs 103 and 104 can be obtained.)

Meanwhile, time stamps are removed from the packets to which time stamp values 12S to 12E are temporarily attached in the HDD 103, as in the foregoing Embodiment 1, and the packets are transferred to the HDD 104 at the timing corresponding to the time stamps. In the HDD 104, for example, time stamp values 22S to 22E are attached to the packets as in a similar manner in the HDD 103, as also shown in FIG. 13A, and the packets are recorded into the HDD main unit 305. The time stamp values are also independent of the time information indicated by the PCR packet and of the time stamps attached in the HDD 103.

Accordingly, there is no continuity between the time stamp values 11S to 11E and the time stamp values 22S to 22E that are respectively recorded into the HDDs 103 and 104.

Figure 13B:
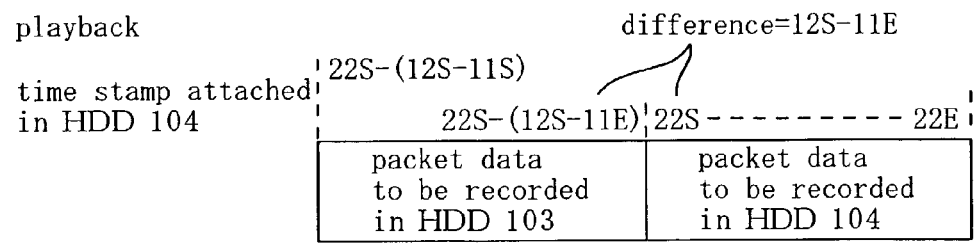

When playing back the stream data that are thus recorded, first, the HDD 104 is notified of the value (12S-11S) that is held in the HDD 103 as additional information to the relay command or the like. In the HDD104, a value 22S-(12S-11S) based on the acknowledged value and the time stamp value 22S of the most leading packet recorded in the HDD 104 is set in the counter 302b as the initial time stamp value (at the timing at which it is attached to the most leading packet to be relayed). (When a value is set in the counter 302b as described above, the difference from the value held in the counter difference-computing section 404 becomes indeterminate, and for this reason, it is preferable that the PLL operation (feedback operation) be temporarily stopped by, for example, fixing the output from the difference-comparing section 405.) Then, as shown in FIG. 13B, when the packets recorded in the HDD 103 are relayed by the HDD 104, time stamps are attached in the HDD 104 such that they are continuous with the packets recorded in the HDD 104. More specifically, the difference between the time stamp attached to the packet last recorded in the HDD 103 and the time stamp attached to the packet first recorded in the HDD 104 becomes the same (12S-11E) during recording and during playback. Thus, by the stream data-generating section 306 of the HDD 104, the packets are output in the form of stream data at timing according to the time stamps as described above, and therefore, the intervals between the end of the packet to be relayed and the head of the packet recorded in the HDD 104 is maintained to be the same as they were received by the HDD 103 during recording.

Here, the initial value of the time stamps at the time when packets start to be received during recording or playing may be any values, as mentioned above, and therefore, unlike Embodiment 1, it is not necessary that time information contained in the PCR be loaded to the counter 302*b*. For this reason, it is not essential to perform a recording preparation operation for synchronizing the value of the counter 302*b* and the time information contained in the PCR packet, as is the case in Embodiment 1. However, it is necessary that the clock frequency that is output by the VCO 302*e* have a predetermined accuracy. For this purpose, it is possible to use a management packet for synchronizing the system time clock transmitted from one of the HDDs 103 and 104, or from a server device or the like, or it is possible to use an oscillator that itself has high accuracy in order for the clock frequency to have a predetermined accuracy. Nevertheless, it is not impossible that proper recording and playback operations can be performed even when a recording preparation operation is performed as in Embodiment 1 so that time information contained in the PCR is loaded in the counter 302*b* for synchronization. (It should be noted that the clock may not always be used in common between the time stamp-generating section 302 and the stream data-generating section 306, as described above, but independent clocks may be used for time stamp-generating section 302 and the stream data-generating section 306.)

It also should be noted that the above-described configuration can be easily applied to cases where stream data are divided and recorded into three or more HDDs. If this is the case, the stream data that are output from the second HDD during playing are continuous stream data regardless of to which of the first or the second HDD the data were recorded, so it is sufficient that the initial time stamp value to be set in the counter 302*b* in the third HDD be a value corresponding to the time stamp attached to the packet that is first recorded in the first HDD. Nevertheless, it is sufficient that the value (information) to be acknowledged to the third HDD be substantially a value such that the above-described value can be obtained. For example, it is possible to acknowledge such information indicating the relationship between the time stamps attached to the packets recorded in the first HDD and those attached to the packets recorded in the second HDD and the relationship between the time stamps attached to the packets recorded in the second HDD and those attached to the packets recorded in the third HDD. Alternatively, such information is acknowledged to the third HDD via the second HDD.

In the present embodiment as well, it is possible to employ a controlling device that does not have the HDD main unit 305, or to transfer the stream data to the HDD 104 and thereafter record into the HDD 103, as will be described later.

Embodiment 3

Figure 14:
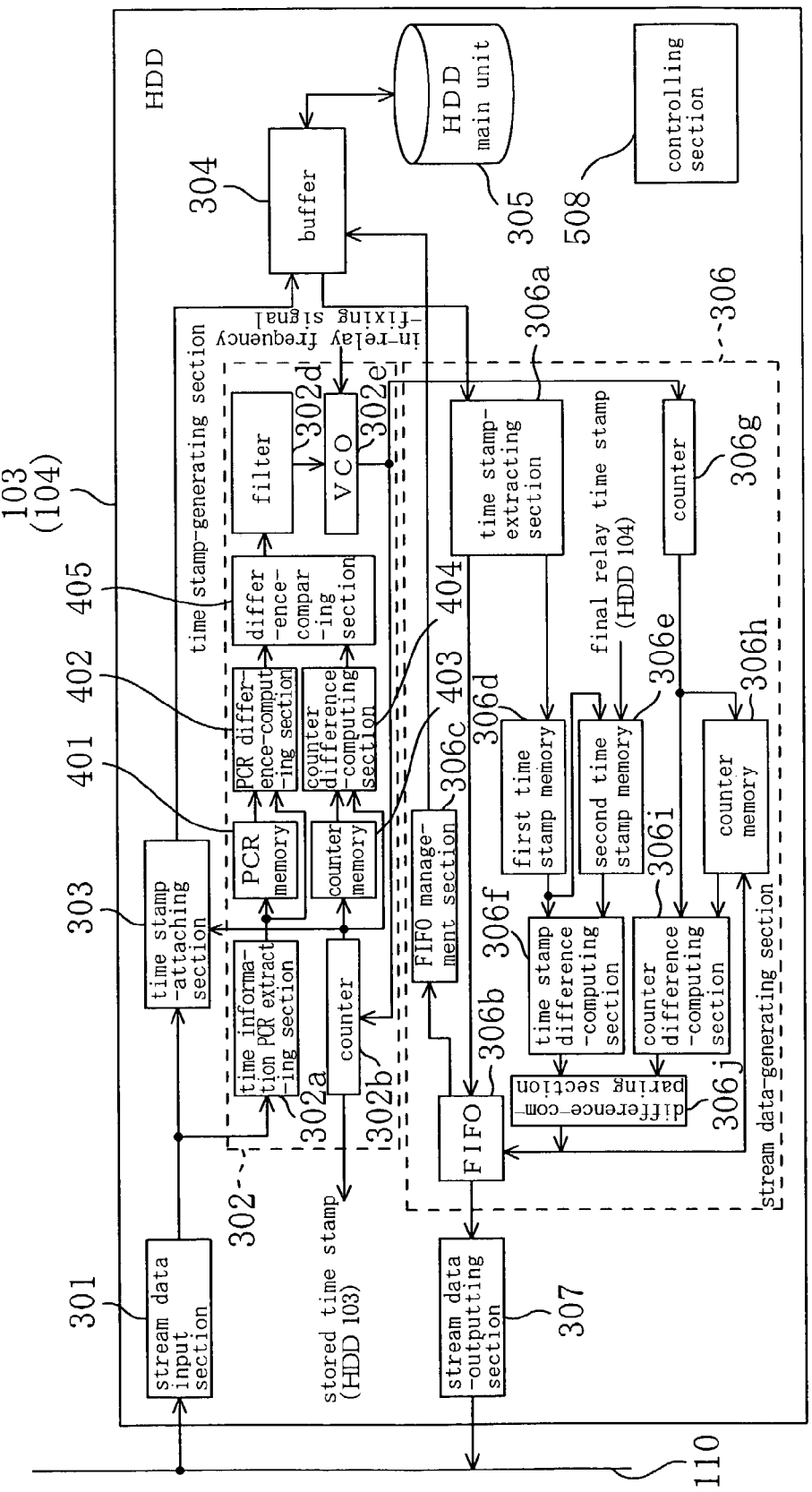
FIG. 14 is a block diagram showing the configuration of a hard disk drive according to embodiment 3 of the present invention.

With reference to FIG. 14, another embodiment of the stream data recording and playing device is described in which continuous stream data can be output during playback even when time stamps attached to the packets respectively recorded in the HDDs 103 and 104 are not continuous between the HDDs 103 and 104, as well as Embodiment 2. In this stream data recording and playing device, continuous stream data can be output even when time stamps are not continuous in the HDD 104 that relays the packets during playback, since output timing of the packets are properly controlled.

The basic configuration of the stream data recording and playing device is the same as the configuration of the device according to the foregoing Embodiment 2 (FIG. 12), except that, in the HDD 104, a predetermined time stamp is set in the second time stamp memory 306*e* of the stream data-generating section 306 under the control of a controlling section 508 during playback, in place of the setting of an initial time stamp value in the counter 302*b* of the time stamp-generating section 302.

Figure 15A:
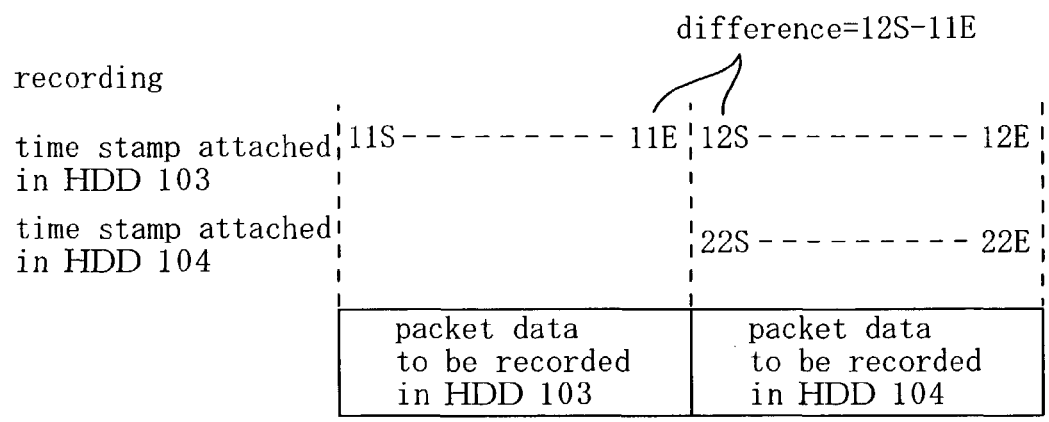
FIGS. 15A and 15B are diagrams for illustrating time stamps that are attached to the packets.

In this example, for the operation during recording, time stamps that do not have continuity are attached to the packets that are recorded into the HDDs 103 and 104, as in the case of Embodiment 2 above. (See FIG. 15A.) However, the controlling section 508 of the HDD 103 reads out a time stamp value 11E that is attached to the last packet recorded in the HDD 103 and a time stamp value 12S the most leading packet to be recorded in the HDD 104 from the counter 302*b*, and it holds the difference (12S-11E) and notifies the HDD 104 of the difference.

Figure 15B:
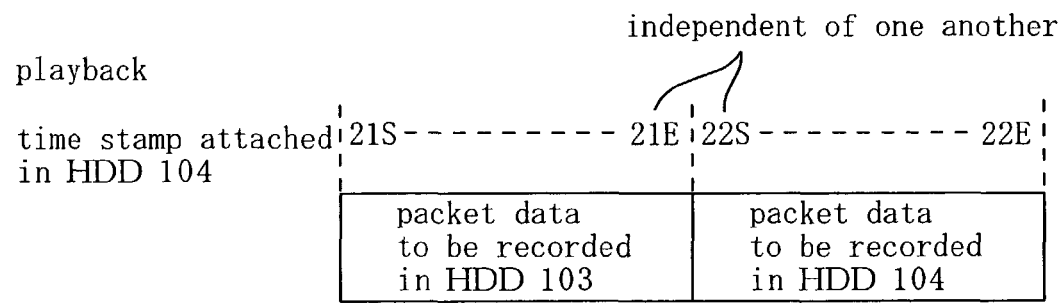

On the other hand, in cases where the packets recorded in the HDD 103 are relayed by the HDD 104 during playback, the initial value of the counter 302*b* is not particularly controlled. Thus, values 21S to 21E, which are irreverent to both time stamps attached in the HDD 103 and time stamps attached to the packets recorded in the HDD 104, are attached to the packets that are input from the HDD 103 and are relayed by the HDD 104, as shown in FIG. 15B, and these packets are output in the form of stream data at the timing according to the time stamps. Then, when the last packet that is relayed (the packet with a time stamp value of 21E) is output from the stream data-generating section 306, a value 22S-(12S-11E) obtained from the value (12S-11E) acknowledged from the HDD 103 and the time stamp value 22S of the most leading packet recorded in the HDD 104 is set into the second time stamp memory 306*e*, not the above-described value 21E. Thus, after the last packet to be relayed (the last packet recorded in the HDD 103) is output from the stream data-generating section 306, a time corresponding to the value (12S-11E) elapses, and then, the most leading packet recorded in the HDD 104 is output. That is, the interval between the end of the packet to be relayed and the head of the packet recorded in the HDD 104 is maintained to be the same as was received by the HDD 103 during recording, and thus continuous stream data are output.

Here, it is not impossible that proper recording and playback operations can be performed even when a recording preparation operation is performed as in Embodiment 1 so that time information contained in the PCR is loaded in the counter 302*b* for synchronization.

In place of setting the value 22S-(12S-11E) in the second time stamp memory 306*e* as described above, it is also possible that a value obtained by adding 21E-22S+(12S-11E) to each time stamp may be set in the first time stamp memory 306*d* each time the packet recorded in the HDD 104 is output.

Furthermore, when the stream data-generating section 306 is configured such that the time stamp attached to the packet that is first sent out is set as the initial value of the counter 306*g*, and each subsequent packet is output each time the time stamp attached to each of the subsequent packets matches the value of the counter 306g, as described in Embodiment 1 above, it is sufficient that when the last packet that is relayed is output from the stream data-generating section 306, a value 22S−(12S-11E) is set in the counter 306g.

In the present embodiment as well, it is possible to use three or more HDDs. It is also possible to employ a controlling device that does not have the HDD main unit 305, or to transfer the stream data to the HDD 104 and thereafter record into the HDD 103.

Embodiment 4

Figure 16:
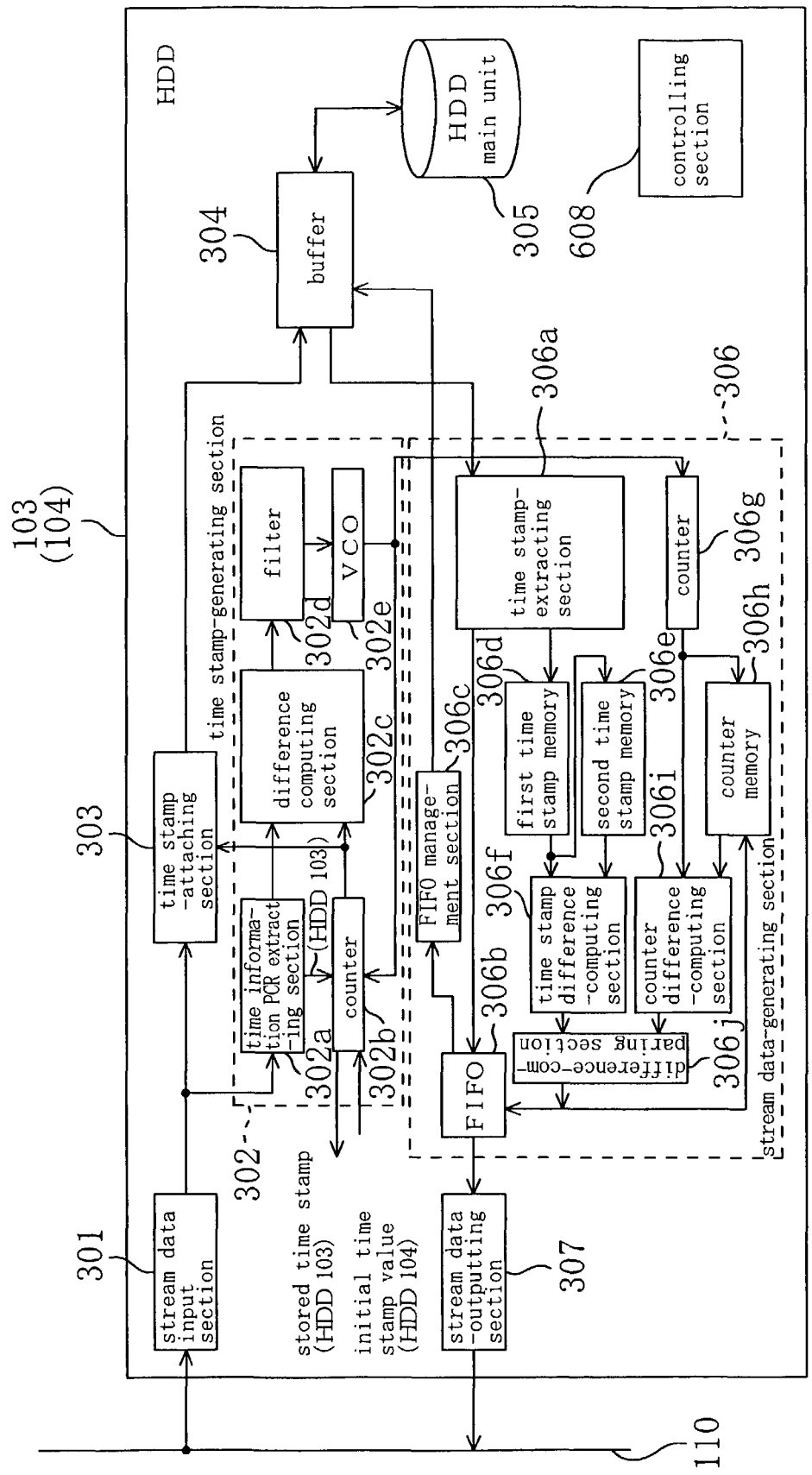
FIG. 16 is a block diagram showing the configuration of a hard disk drive according to embodiment 4 of the present invention.

With reference to FIG. 16, another embodiment of the stream data recording and playing device is described in which continuous time stamps are attached at the time of recording, as well as Embodiment 1. The configuration of this device is basically the same as that of Embodiment 1 (FIG. 3), except that the counter 302b of the time stamp-generating section 302 can output its held value as a storing time stamp or hold a predetermined value as a initial time stamp value under the control of a controlling section 608.

In this stream data recording and playing device, time stamps are attached in synchronization with PCR during recording, as in a similar manner to Embodiment 1. However, the time stamp to be attached to the most leading packet in the HDD 104 is not performed by the PCR itself but according to notification from the HDD 103. Specifically, the HDD 103 notifies the HDD 104 of a value to be held in the counter 302b when a time stamp is attached to the most leading packet to be recorded in the HDD 104. The HDD 104 sets the acknowledged value as the initial time stamp value in the counter 302b, and attaches time stamps that are continuous with the time stamps attached to the packets recorded in the HDD 103, to the packets to be recorded in the HDD 104. That is, the HDD 104 is notified of the initial time stamp value during the time in which, after a time stamp is attached in the HDD 103 to the most leading packet to be recorded in the HDD 104, the packet is transferred to the HDD 104 through the buffer 304, the stream data-generating section 306, and so forth and a time stamp is attached by the time stamp-attaching section 303 in the HDD 104; therefore, continuous time stamps can be attached to the packets recorded in the HDDs 103 and 104.

In addition, also during playing, the HDD 104 is notified of the time stamp value attached to the most leading packet recorded in the HDD 103 in advance, and the time stamp value is set in the HDD 104 as the initial time stamp value in the counter 302b; therefore, time stamps that are continuous with the time stamps that are attached to the packets recorded in the HDD 104 are attached to the packets that are output from the HDD 103, and thus, continuous stream data can be played back. (It should be noted that because the time stamps attached to the recorded packets consequently become the same as in Embodiment 1, it is possible to use the device described in Embodiment 1 to play the data.)

A described above, because the notification of time stamp values and the control of initial values are carried out, it is not always necessary to perform the recording preparation operation as described in Embodiment 1 insofar as the clock frequency output by the VCO 302e has a predetermined accuracy at the time when packets start to be received during recording or playing due to the clock frequency control as explained in Embodiment 2.

It is also possible that the notification of an initial time stamp value as described above by generating a packet containing time information when starting to transfer stream data to output the packet as the initial packet.

In the foregoing, time stamps are described to be synchronized with time information contained in the PCR packet, but it is also possible that the difference between time stamps may be synchronized with the difference in the two pieces of time information contained in the PCR packets, as in the case of Embodiment 2.

In the present embodiment as well, it is possible to use three or more HDDs. It is also possible to employ a controlling device that does not have the HDD main unit 305, or to transfer the stream data to the HDD 104 and thereafter record into the HDD 103.

Variations

The foregoing embodiments have illustrated examples in which stream data are first recorded into the HDD 103 and thereafter recorded into the HDD 104, but recording can be started from either of the HDDs by providing a controlling section having the functions of the controlling sections 308 and 309, in place of the controlling sections 308 and 309.

Figure 17A:
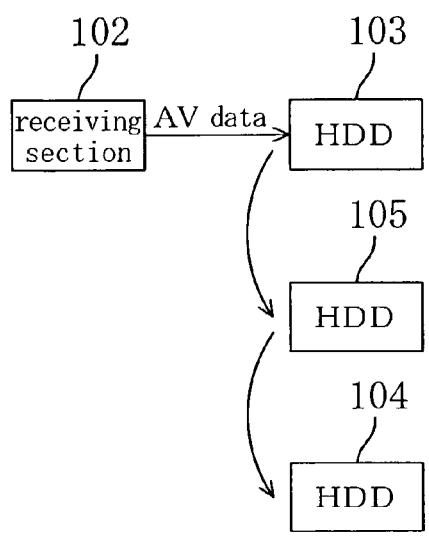
FIGS. 17A and 17B are diagrams for illustrating the recording operation in one variation of the present invention.
Figure 17B:
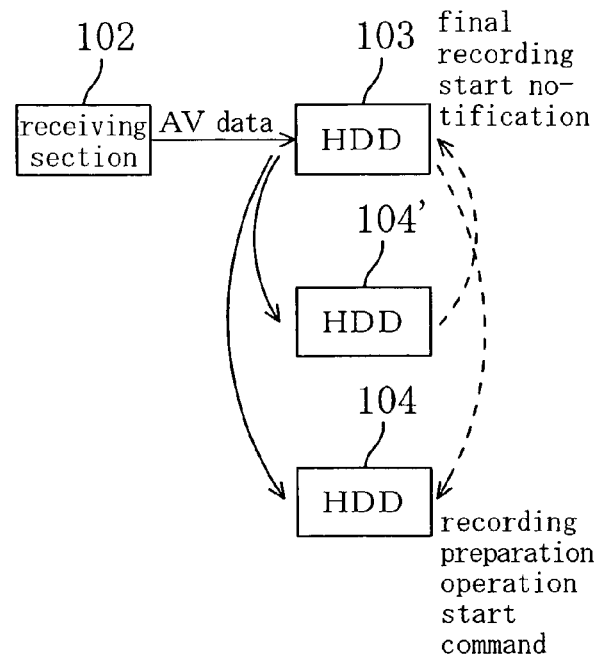

The foregoing examples show that split recording is performed into two HDDs 103 and 104, but recording into three or more HDDs can be easily accomplished. Specifically, for example as shown in FIG. 17A, in addition to the HDD 103 and the HDD 104, a HDD 105 may be provided that has a function of recording stream data that are relayed, as the HDD 104, and a function of relaying the stream data to the HDD 104 at the end of recording, as the HDD 103, in order that the packets sent from the receiving section 102 to the HDD 103 are relayed to the HDD 104 through the HDD 103 and HDD 105. It is also possible that as shown in FIG. 17B, in addition to the HDD 103 and the HDD 104, a HDD 104' having substantially the same functions as the HDD 104 may be provided such that when the free space in the HDD 104' reaches a predetermined amount, the HDD 104' issues a final recording start notification to the HDD 103, and in response to this, the HDD 103 issues a recording preparation operation start command to the HDD 104 and performs data transfer. Alternatively, if the HDD 103 can detect that the free space in a given HDD reaches a predetermined amount by counting the amount of data relayed to the HDDs, it is sufficient that simply a plurality of the HDDs 104 are provided.

Figure 18A:
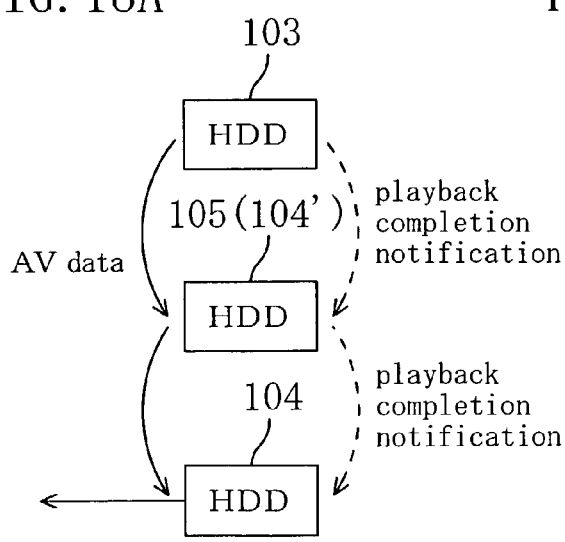
FIGS. 18A and 18B are diagrams for illustrating the playback operation in one variation of the present invention.
Figure 18B:
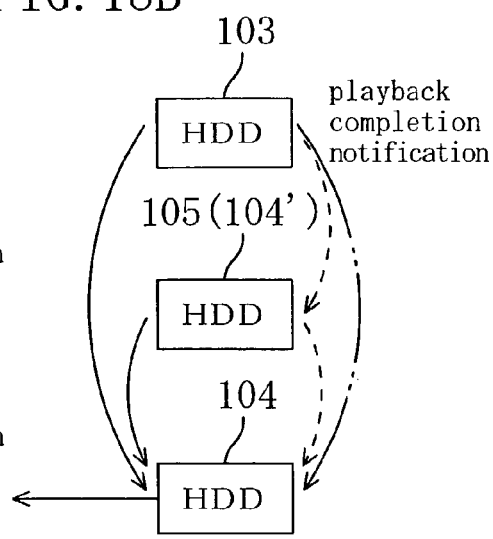

On the other hand, in cases where stream data are played back from three HDDs 103 to 105, for example as shown in FIG. 18A, it is possible that the packets output from the HDD 105 (104') are input to the HDD 104 and then from the HDD 104 to the receiving section 102 (thus a presenting device or the like, which is not shown in the drawings). (In this case, for example, the playback completion notification is sent from the HDD 103 to HDD 105 (the HDD 104') and likewise is sent from the HDD 105 (the HDD 104') to the HDD 104.) Alternatively, as shown in FIG. 18B, it is possible that packets may be transferred directly from each of the HDDs 103 and 105 (the HDD 104') to the HDD 104. (In this case, the playback completion notification is sent from the HDD 103 to the HDD 104 directly or via the HDD 105 (the HDD 104').) Here, in the case of FIG. 18A, it is necessary that, at the start of playback, proper time stamps be generated between the HDDs 105 and 104 as well as between the HDDs 103 and 105 with a PCR packet or the like. Specifically, in the cases of Embodiments 2 to 4, it is necessary that the difference between the time stamps be equal to the difference between two pieces of time information contained in the successive PCR packets. In the case of Embodiment 1, it is necessary that the time stamp be synchronized with the time information.

In addition, in cases where three or more HDDs are provided as well, as shown in FIGS. 10 and 11, the recording and playback operations may be controlled by commands from the receiving section 102 or the like.

It is also possible that a HDD that does not have the split recording or combined playing functions may be provided together and connected to the bus 110.

Figure 19A:
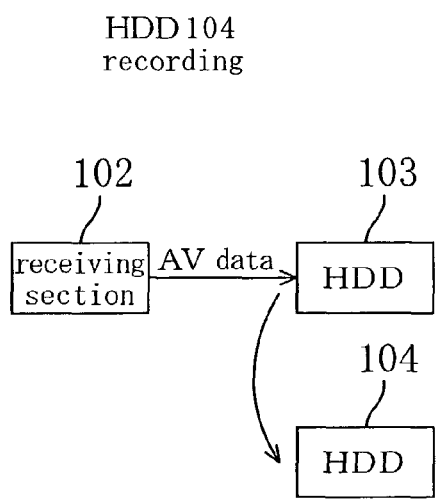
FIGS. 19A and 19B are diagrams for illustrating the recording operation in another variation of the present invention.
Figure 19B:
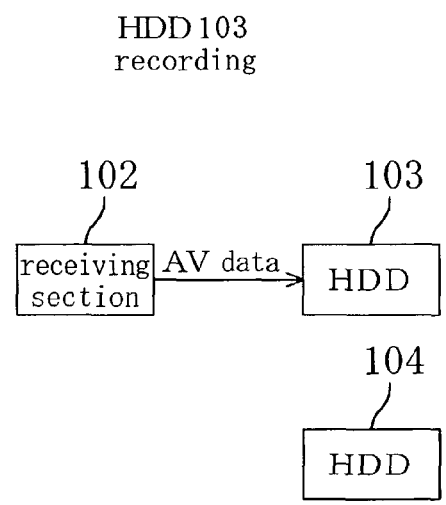

The foregoing embodiments illustrated the examples in which stream data from the receiving section 102 are input into the HDD 103 and are recorded in sequence from the HDD 103 to the HDD 104, but it is possible that recording may be performed from the HDD 104 first. This is achieved if, as shown in FIG. 19A, the HDD 103 transfers stream data input form the receiving section 102 to the HDD 104, and after free space in the HDD 104 runs out, as shown in FIG. 19B, recording into the HDD 103 is performed. In this case, proper time stamps can be generated in the HDDs 103 and 104 by sending stream data containing time information, such as a PCR packet, from the HDD 103 to the HDD 104 prior to recording into the HDD 104. In order to control the timing of starting recording into to the HDD 103, information indicating that available free space in the HDD 104 is running out can be sent from the HDD 104 to the HDD 103, or the HDD 103 can confirm available free space in the HDD 104 in advance and count the amount of data to be transferred to the HDD 104.

Figure 20A:
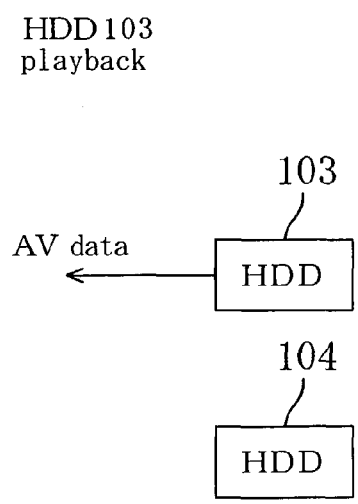
FIGS. 20A and 20B are diagrams for illustrating the playback operation in one variation of the present invention.
Figure 20B:
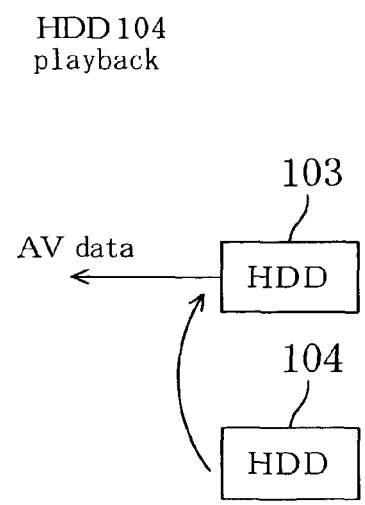

Likewise, the sequence for the playback may be reversed. The foregoing embodiments illustrated the examples in which stream data played back from the HDD 103 are transferred first to the HDD 104, and then from the HDD 104 (via the receiving section 102) to a presenting device or the like. However, for example, it is possible that as shown in FIG. 20A, data are first output from the HDD 103 to (via the receiving section 102) directly to the presenting device or the like, and thereafter, as shown in FIG. 20B, stream data played back from the HDD 104 are transferred to the HDD 103. It should be noted, however, that it is necessary that data transfer from the HDD 104 are performed at such timing that the output from the HDD 103 has not finished and the buffer 304 does not overflow.

Figure 21:
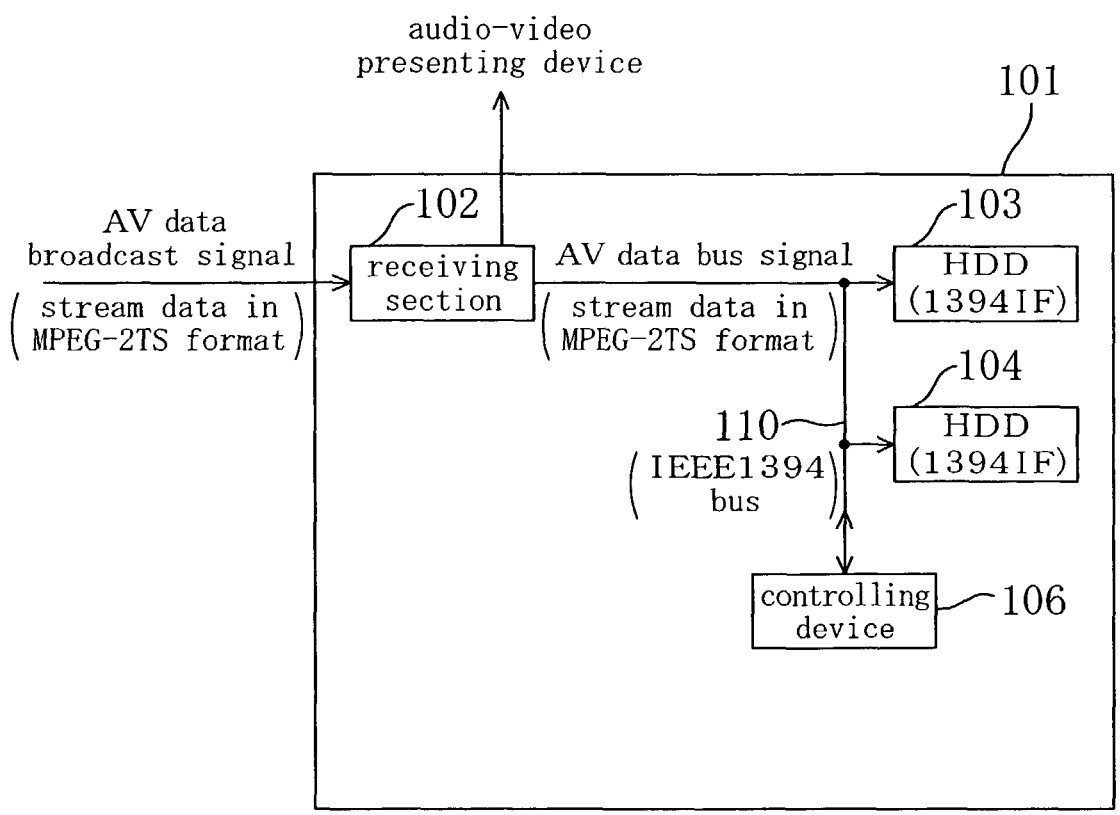
FIG. 21 is a block diagram showing a primary portion of a receiver recording and playing device having a controlling device according to further another variation of the present invention.
Figure 22:
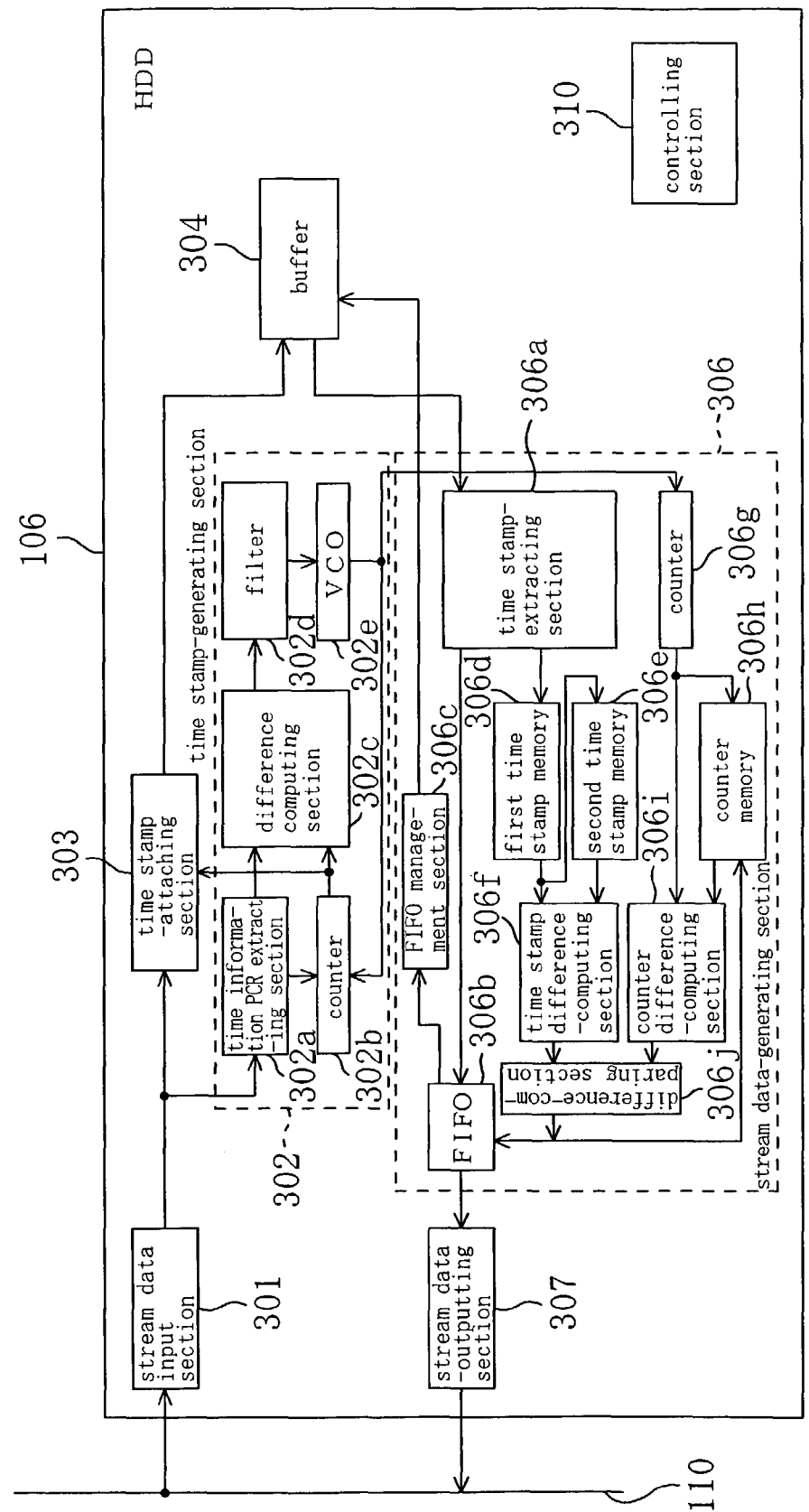
FIG. 22 is a block diagram showing the configuration of the controlling device thereof.

In addition, for example as shown in FIGS. 21 to 23, it is possible to eliminate the HDD main unit, and a controlling section 310 may be provided and a controlling device 106 may be used that mainly performs relay of stream data and control for HDDs. This configuration is similar to the cases where the recording amount itself of the HDD 103 illustrated in FIG. 17B or the HDD 104 in FIG. 18B is 0. Thus, split recording and combined playing of stream data can be properly performed, and moreover, a simple configuration is achieved since the controlling sections 308 and 309 in the HDDs 103 and 104 do not require the recording relay-controlling section 308b or the playback relay-controlling section 309c. In addition, the receiving section 102 may be provided with the function of the controlling device 106.

Further, the foregoing PLL operation as described above is not essential to synchronize the difference between the time stamps with two pieces of time information contained in the PCR packet as in Embodiment 2, but instead, it is possible that, for example, the clock frequency may have a predetermined accuracy. The foregoing PLL operation as described above is also not essential to synchronize the time stamp with time information contained in the PCR packet as in Embodiment 1, but instead, it is possible that, for example, the clock frequency may have a predetermined accuracy and the initial value of the time stamp may be the time information.

The foregoing embodiments illustrated that PCR packet is used as a packet containing time information, but this is for illustrative purposes only. For example, a user packet containing time information may also be used instead.

The foregoing embodiments illustrated that an IEEE 1394 standard bus is used for the bus 110. However, the bus 110 is not so limited, and insofar as the interface can transmit stream data synchronized with reproduction timing and can configure a network, additional HDDs can be easily installed by merely connecting the HDDs with the network to perform split recording and combined playing of stream data. Also, the format of stream data is not limited to the MPEG-2 TS format. When stream data transmission that are similar to those output from the receiving section 102 is performed between the HDDs 103 and 104, split recording and combined playing as described above can be performed, and it is not necessary to use exclusive signal lines or special packet formats. Therefore, it is possible to use various transmission systems and data formats with synchronization characteristics.

As has been described thus far, in the present invention, data to be recorded or played are extracted from input stream data; temporary time stamps are attached thereto and then removed therefrom; and the data are transferred to another recording and playing device at timing according to the time stamps. As a consequence, it is possible to record stream data for a longer time than a time corresponding to the storage capacity of a single stream data recording and playing device so that they can be played back at proper timing, and to play back at proper timing.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A stream data-recording device for recording stream data into a recording medium, the stream data containing time information corresponding to reproduction timing and being input at timing corresponding to stream of reproduction time, comprising:
   an analyzing means for analyzing the input stream data and extracting recording data to be recorded in the recording medium;
   a time stamp-attaching means for generating a time stamp that is synchronized with the time information contained in the recording data and attaching the time stamp to the recording data;
   a recording means for recording the recording data in the recording medium; and
   an output means for generating transfer stream data by removing the time stamp from the recording data that include last data of a predetermined amount of recording data to be recorded into the recording medium and data subsequent thereto, and outputting the generated transfer stream data to another stream data recording device at timing corresponding to the time stamp.

2. The stream data-recording device according to claim 1, wherein:
   when the output means outputs the transferred stream data to further another stream data recording device subsequent to the other stream data recording device, the output means further outputs the transfer stream data generated based on the recording data that are to be recorded into the other stream data recording device and are subsequent to last data of a predetermined amount of recording data to the further another stream data recording device.

3. A first stream data-recording device for recording stream data into a first recording medium, the stream data containing time information corresponding to reproduction timing, comprising:
- an analyzing means for analyzing the stream data and extracting last data that are a predetermined amount of recording data and that are recorded in a second recording medium of a second stream data-recording device and extracting recording data that are subsequent to the predetermined amount of recording data;
- a time stamp-attaching means for generating a time stamp that is synchronized with the time information contained in the predetermined amount of recording data that are recorded in the second recording medium of the second stream data-recording device and attaching the time stamp to at least the recording data that are subsequent to the predetermined amount of recording data;
- a recording means for recording the recording data that are subsequent to the predetermined amount of recording data into the first recording medium of the first stream data-recording device; and
- an output means for generating transfer stream data by removing the time stamp from the recording data that include last data of a predetermined amount of recording data to be recorded into the first recording medium and data subsequent thereto, and outputting the generated transfer stream data to another stream data recording device at timing corresponding to the time stamp.

4. A stream data-recording device for recording stream data into a recording medium, the stream data containing time information corresponding to reproduction timing and being input at timing corresponding to stream of reproduction time, comprising:
- an analyzing means for analyzing the input stream data and extracting recording data to be recorded in the recording medium and a recording medium of another stream data recording device;
- a time stamp-attaching means for generating a time stamp that is synchronized with the time information contained in the recording data and attaching the time stamp to the recording data;
- an output means for generating transfer stream data by removing the time stamp from the recording data to be recorded in the recording medium of the other stream data recording device and outputting the generated transfer stream data to the other stream data recording device at timing corresponding to the time stamp; and
- a recording means for recording, in the recording medium, recording data that are subsequent to the recording data to be recorded in the recording medium of the other stream data recording device.

5. A stream data playing device for playing back continuous stream data from first and second recording data to which continuous time stamps are attached and which are respectively recorded in a first recording medium in the stream data playing device and in a second recording medium in another stream data playing device, comprising:
- a playing means for reading out the first recording data from the first recording medium and outputting the first recording data as first playback output data;
- an analyzing means for analyzing transfer stream data that are generated by the other stream data playing device by reading out the second recording data from the second recording medium and removing the time stamp therefrom, and are output from the other stream data playing device at timing corresponding to the time stamp, and for extracting second playback output data;
- a time stamp-attaching means for generating a time stamp synchronized with time information contained in the second playback output data and attaching the time stamp to the second playback output data; and
- an outputting means for generating playback stream data by removing the time stamps from the first playback output data and the second playback output data and sequentially outputting the generated playback stream data at timing corresponding to the time stamps.

6. The stream data playing device according to claim 5, wherein the outputting means outputs playback stream data generated from the first playback output data after playback stream data generated from the second playback output data have been output.

7. A stream data recording-controlling device for controlling recording of stream data into a recording medium of a stream data recording device, the stream data containing time information corresponding to reproduction timing and being input at timing corresponding to stream of reproduction time, comprising:
- an analyzing means for analyzing the input stream data and extracting recording data to be recorded in the recording medium;
- a time stamp-attaching means for generating a time stamp that is synchronized with the time information contained in the recording data and attaching the time stamp to the recording data; and
- an output means for generating transfer stream data by removing the time stamp from the recording data, for outputting the generated transfer stream data at timing corresponding to the time stamp to the stream data recording device, and for outputting, prior to start of the outputting transfer stream data, predetermined stream data containing time information that is precedent to the transfer stream data at the start of the outputting to the stream data recording device.

8. The stream data recording-controlling device according to claim 7, wherein when the output means outputs the transfer stream data to a stream data recording device subsequent to the second stream data recording device onward, the output means outputs, as the predetermined stream data containing time information, the transfer stream data that are to be output to a preceding stream data recording device also to a subsequent stream data recording device.

9. A stream data playback-controlling device for controlling output of continuous playback stream data based on recording data to which continuous time stamps are attached and which are respectively recorded into a plurality of stream data playing device, comprising:
- an analyzing means for analyzing transfer stream data that are generated by each of the stream data playing devices by removing the time stamps from the recording data respectively recorded therein and outputting at timing corresponding to the time stamps, and for extracting playback output data;
- a time stamp-attaching means for generating a time stamp synchronized with the time information contained in the playback output data and attaching the time stamp to each of the playback output data; and
- an outputting means for generating playback stream data by removing the time stamp from each of the playback output data and sequentially outputting the generated playback stream data at timing corresponding to the time stamp.

10. A stream data-recording method of recording stream data into a recording medium of a stream data recording device, the stream data containing time information corresponding to reproduction timing and being input at timing corresponding to stream of reproduction time, comprising;

a first extracting step of analyzing the input stream data and extracting recording data to be recorded in the recording medium;

a first time stamp-attaching step of generating a time stamp synchronized with the time information contained in the recording data and attaching the time stamp to the recording data;

an outputting step of dividing the recording data to which the time stamp is attached, generating transfer stream data by removing the time stamp from the divided recording data, and transferring the generated transfer stream data to the stream data recording device at timing corresponding to the time stamp;

a second extracting step of, in the stream data recording device to which the transferred stream data are input, analyzing the input stream data and extracting recording data to be recorded in the recording medium of the stream data recording device;

a second time stamp-attaching step of generating a time stamp synchronized with the time information contained in the recording data and attaching the time stamp to the recording data; and a recording step of recording the recording data to which the time stamp is attached into the recording medium.

11. A stream data playing method of playing continuous stream data from recording data to which continuous time stamps are attached and which are recorded into recording media of a plurality of stream data recording devices, comprising:

a playing step of reading out the first recording data recorded in a recording medium of the first stream data recording device and outputting the data as the first playback output data;

an outputting step of, in the second stream data recording device, reading out the second recording data recorded in the recording medium, and outputting transfer stream data generated by removing the time stamps at timing corresponding the time stamps;

an extracting step of analyzing the transfer stream data that are output and extracting second playback output data;

a time stamp-attaching step of generating a time stamp being synchronized with the time information contained in the second playback output data and continuous with a time stamp attached to the first playback output data, and attaching the generated time stamp to the second playback output data; and an outputting step of generating playback stream data by removing the time stamps from the first and the second playback output data to which the time stamps are attached, and sequentially outputting the generated playback stream data at timing corresponding to the time stamps.

12. A stream data playing method of playing continuous stream data from recording data to which continuous time stamps are attached and which are recorded into recording media of a plurality of stream data recording devices, comprising:

an outputting step of reading out the recording data respectively recorded into the recording media in the plurality of stream data recording devices and outputting transfer stream data generated by removing the time stamps at timing corresponding to the time stamps;

an extracting step of analyzing the transfer stream data that are output and extracting playback output data;

a time stamp-attaching step of generating time stamps that are synchronized with the time information contained in the playback output data and are continuous between the playback output data corresponding to the plurality of stream data recording devices, and attaching the generated time stamps to the playback output data; and an outputting step of generating playback stream data by removing the time stamps from the playback output data to which the time stamps are attached, and sequentially outputting the generated playback stream data at timing corresponding to the time stamps.

13. A stream data-recording device for recording stream data into a recording medium, the stream data containing time information corresponding to reproduction timing and being input at timing corresponding to stream of reproduction time, comprising:

an analyzing means for analyzing the input stream data and extracting recording data to be recorded in the recording medium or a recording medium in another stream data recording device;

a time stamp-attaching means for generating a time stamp being controlled such that a time difference obtained by two pieces of time information contained in each of the recording data is equal to a difference between time stamps attached to the recording data that contain the two pieces of time information, and attaching the time stamp to the recording data;

a recording means for recording a first recording data that is one of divided recording data into the recording medium;

an output means for generating transfer stream data by removing the time stamp from a second recording data that is the other one of the divided recording data and is subsequent to the first recording data and outputting the generated transfer stream data to the other stream data recording device at timing corresponding to the time stamp; and a time stamp information-outputting means for outputting time stamp information corresponding to a relationship between the time stamp attached to the first recording data and the time stamp attached to the second recording data to the other stream data recording device.

14. The stream data recording device according to claim 13, wherein the time stamp information represents a difference between a time stamp attached to at least one of the head and the end of the first recording data and a time stamp attached to the head of the second recording data.

15. A stream data-recording device for recording stream data into a recording medium, the stream data containing time information corresponding to reproduction timing and being input at timing corresponding to stream of reproduction time, comprising:

an analyzing means for analyzing the input stream data and extracting recording data to be recorded in the recording medium or a recording medium in another stream data recording device;

a time stamp-attaching means for generating a time stamp being controlled such that a time difference obtained by two pieces of time information contained in each of the recording data is equal to a difference between time stamps attached to the recording data that contain the two pieces of time information, and attaching the time stamp to the recording data;

an output means for generating transfer stream data by removing the time stamp from a first recording data that is one of divided recording data, and outputting the generated transfer stream data to the other stream data recording device at timing corresponding to the time stamp;

a recording means for recording a second recording data that is the other one of the divided recording data and is subsequent to the first recording data into the recording medium; and a time stamp information-holding means for holding time stamp information corresponding to the time stamp attached to the first recording data.

16. A stream data playing device for playing back continuous stream data from first and second recording data to which continuous time stamps are attached and which are respectively recorded in a first recording medium in the stream data playing device and in a second recording medium in another stream data playing device, comprising:

a playing means for reading out the first recording data from the first recording medium and outputting the first recording data as first playback output data;

an analyzing means for analyzing transfer stream data that are generated by the other stream data playing device by reading out the second recording data from the second recording medium and removing the time stamp therefrom, and are output from the other stream data playing device at timing corresponding to the time stamp, and for extracting second playback output data;

a time stamp-attaching means for setting as an initial value a time stamp obtained based on the relationship between the time stamps attached to the first and the second recording data when continuous time stamps are attached to the first and the second recording data and based on the time stamp attached to the first recording data, and attaching to the second playback output data a time stamp that is continuous with the time stamp attached to the first recording data; and an outputting means for generating playback stream data by removing the time stamps from the first and the second playback output data, and sequentially outputting the generated playback stream data at timing corresponding to the time stamps.

17. The stream data playing device according to claim 16, wherein the outputting means outputs the playback stream data generated from the first playback output data after the playback stream data generated from the second playback output data have been output.

18. A stream data playing device for playing back continuous stream data from first and second recording data to which continuous time stamps are attached and which are respectively recorded in a first recording medium in the stream data playing device and in a second recording medium in another stream data playing device, comprising:

a playing means for reading out the first recording data from the first recording medium and outputting the first recording data as first playback output data;

an analyzing means for analyzing transfer stream data that are generated by the other stream data playing device by reading out the second recording data from the second recording medium and removing the time stamp therefrom, and are output from the other stream data playing device at timing corresponding to the time stamp, and for extracting second playback output data;

a time stamp-attaching means for generating a time stamp corresponding to timing of receiving the second playback output data, or a time stamp being controlled such that a time difference obtained by two pieces of time information contained in each of the second playback output data is equal to a difference between time stamps attached to second playback output data that contain the two pieces of time information, and attaching the time stamp to the second playback output data; and an outputting means for generating playback stream data by removing the time stamps from the first and the second playback output data, sequentially outputting the generated playback stream data at timing corresponding to the time stamps, and controlling the timing from the time when an end of one of the first or the second playback stream data is output until a head of the other one is output to be such a timing corresponding to the difference between a time stamp attached to the end of one of the first or the second playback stream data and a time stamp attached to the head of the other one when continuous time stamps are attached to the first and the second recording data.

19. The stream data playing device according to claim 18, wherein the outputting means outputs the playback stream data generated from the first playback output data after the playback stream data generated from the second playback output data have been output.

20. A stream data recording-controlling device for controlling recording of stream data into a recording medium of a stream data recording device, the stream data containing time information corresponding to reproduction timing and being input at timing corresponding to stream of reproduction time, comprising:

an analyzing means for analyzing the input stream data and extracting recording data to be recorded in the recording medium;

a time stamp-attaching means for generating a time stamp being controlled such that a time difference obtained by two pieces of time information contained in each of the recording data is equal to a difference between time stamps attached to the recording data that contain the two pieces of time information, and attaching the time stamp to the recording data;

an output means for generating transfer stream data by removing the time stamp from the recording data, and outputting the generated transfer stream data to the stream data recording device at timing corresponding to the time stamp; and a time stamp information-outputting means for outputting, to the stream data recording device, time stamp information corresponding to the relationship between a time stamp attached to the recording data for the transfer stream data and a time stamp attached to the recording data for transfer stream data that is continuous with the transfer stream data, or time stamp information corresponding to the time stamp attached to the recording data for the transfer stream data.

21. A stream data playing method of playing continuous stream data from recording data to which continuous time stamps are attached and which are recorded into recording media of a plurality of stream data recording devices, comprising:

a first extracting step of analyzing the input stream data and extracting recording data to be recorded in the recording medium;

a first time stamp-attaching step of generating a time stamp being controlled such that a time difference obtained by two pieces of time information contained in each of the recording data is equal to a difference between time stamps attached to the recording data that contain the two pieces of time information, and attaching the time stamp to the recording data;

an outputting step of dividing the recording data to which the time stamp is attached, generating transfer stream data by removing the time stamp from the divided recording data, and transferring the generated transfer stream data to the stream data recording device at timing corresponding to the time stamp;

a time stamp information-acknowledging step of acknowledging, to the stream data recording devices, time stamp information corresponding to the relationship between time stamps attached to respective divided recording data, or corresponding to time stamps attached to respective recording data;

a second extracting step of, in the stream data recording device to which the transferred stream data are input, analyzing the input stream data and extracting recording data to be recorded in the recording medium of the stream data recording device;

a second time stamp-attaching step of generating a time stamp being controlled such that a time difference obtained by two pieces of time information contained in each of the recording data is equal to a difference between time stamps attached to the recording data that contain the two pieces of time information, and attaching the time stamp to the recording data; and a recording step of recording the recording data to which the time stamp is attached into the recording medium.

22. A stream data playing method of playing continuous stream data from recording data to which continuous time stamps are attached and which are recorded into recording media of a plurality of stream data recording devices, comprising:

a playing step of reading out the first recording data recorded in a recording medium of the first stream data recording device and outputting the data as the first playback output data;

an outputting step of, in the second stream data recording device, reading out the second recording data recorded in the recording medium, and outputting transfer stream data generated by removing the time stamps at timing corresponding the time stamps;

an extracting step of analyzing the transfer stream data that are output and extracting second playback output data;

a time stamp-attaching step of setting as an initial value a time stamp obtained based on the relationship between the time stamps attached to the first and the second recording data when continuous time stamps are attached to the first and the second recording data and based on the time stamp attached to the first recording data, and attaching to the second playback output data a time stamp that is continuous with the time stamp attached to the first recording data; and an outputting step of generating playback stream data by removing the time stamps from the first and the second playback output data and sequentially outputting the generated playback stream data at timing corresponding to the time stamps.

23. A stream data playing method of playing continuous stream data from recording data to which continuous time stamps are attached and which are recorded into recording media of a plurality of stream data recording devices, comprising:

a playing step of reading out the first recording data recorded in a recording medium of the first stream data recording device and outputting the data as the first playback output data;

an outputting step of, in the second stream data recording device, reading out the second recording data recorded in the recording medium, and outputting transfer stream data generated by removing the time stamps at timing corresponding the time stamps;

an extracting step of analyzing the transfer stream data that are output and extracting second playback output data;

a time stamp-attaching step of generating a time stamp corresponding to timing of receiving the second playback output data, or a time stamp being controlled such that a time difference obtained by two pieces of time information contained in each of the second playback output data is equal to a difference between time stamps attached to second playback output data that contain the two pieces of time information, and attaching the time stamp to the second playback output data; and an outputting step of generating playback stream data by removing the time stamps from the first and the second playback output data, sequentially outputting the generated playback stream data at timing corresponding to the time stamps, and controlling the timing from the time when an end of one of the first or the second playback stream data is output until a head of the other one is output to be such a timing corresponding to the difference between a time stamp attached to the end of one of the first or the second playback stream data and a time stamp attached to the head of the other one when continuous time stamps are attached to the first and the second recording data.

24. A stream data-recording device for recording stream data into a recording medium, the stream data containing time information corresponding to reproduction timing and being input at timing corresponding to stream of reproduction time, comprising:

an analyzing means for analyzing the input stream data and extracting recording data to be recorded in the recording medium or a recording medium in another stream data recording device;

a time stamp-attaching means for generating a time stamp being controlled such that a time difference obtained by two pieces of time information contained in each of the recording data is equal to a difference between time stamps attached to the recording data that contain the two pieces of time information, and attaching the time stamp to the recording data;

a recording means for recording a first recording data that is one of divided recording data into the recording medium;

an output means for generating transfer stream data by removing the time stamp from a second recording data that is one of divided recording data and outputting the generated transfer stream data at timing corresponding to the time stamp to the other stream data recording device; and a time stamp information-outputting means for outputting time stamp information corresponding to the time stamp attached to the head of the second recording data to the other stream data recording device.

25. A stream data recording-controlling device for controlling recording of stream data into a recording medium of a stream data recording device, the stream data containing time information corresponding to reproduction timing and being input at timing corresponding to stream of reproduction time, comprising:

an analyzing means for analyzing the input stream data and extracting recording data to be recorded in the recording medium;

a time stamp-attaching means for generating a time stamp being controlled such that a time difference obtained by two pieces of time information contained in each of the recording data is equal to a difference between time stamps attached to the recording data that contain the two pieces of time information, and attaching the time stamp to the recording data;

an output means for generating transfer stream data by removing the time stamp from the recording data, and outputting the generated transfer stream data to the stream data recording device at timing corresponding to the time stamp; and a time stamp information-outputting means for outputting, to the stream data recording device, time stamp information corresponding to a time stamp attached to the head of the recording data for the transfer stream data.

26. A stream data-recording method of recording stream data into a recording medium of a stream data recording device, the stream data containing time information corresponding to reproduction timing and being input at timing corresponding to stream of reproduction time, comprising:

a first extracting step of analyzing the input stream data and extracting recording data to be recorded in the recording medium;

a first time stamp-attaching step of generating a time stamp being controlled such that a time difference obtained by two pieces of time information contained in each of the recording data is equal to a difference between time stamps attached to the recording data that contain the two pieces of time information, and attaching the time stamp to the recording data;

an outputting step of dividing the recording data to which the time stamp is attached, generating transfer stream data by removing the time stamp from the divided recording data, and transferring the generated transfer stream data to the stream data recording device at timing corresponding to the time stamp;

a time stamp information-acknowledging step for acknowledging, to the stream data recording device, time stamp information corresponding to a time stamp attached to the head of each of the divided recording data;

a second extracting step of, in the stream data recording device to which the transferred stream data are input, analyzing the input stream data and extracting recording data to be recorded in the recording medium of the stream data recording device;

a second time stamp-attaching step of generating a time stamp being controlled such that a time difference obtained by two pieces of time information contained in each of the recording data is equal to a difference between time stamps attached to the recording data that contain the two pieces of time information, and attaching the time stamp to the recording data;

a time stamp initial value-setting step of setting an initial value of the time stamp to be attached to the recording data by the time stamp-attaching means based on the time stamp information; and a recording step of recording the recording data to which the time stamp is attached into the recording medium.

\* \* \* \* \*